US011771058B2

(12) United States Patent
Yoo et al.

(10) Patent No.: US 11,771,058 B2
(45) Date of Patent: *Oct. 3, 2023

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeon Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 336 days.

This patent is subject to a terminal disclaimer.

(21) Appl. No.: 16/569,827

(22) Filed: Sep. 13, 2019

(65) Prior Publication Data

US 2020/0085014 A1  Mar. 19, 2020

Related U.S. Application Data

(60) Provisional application No. 62/733,393, filed on Sep. 19, 2018.

(30) Foreign Application Priority Data

Nov. 1, 2018 (KR) .......... 10-2018-0132642
Nov. 1, 2018 (KR) .......... 10-2018-0132644
May 21, 2019 (KR) .......... 10-2019-0059514

(51) Int. Cl.
*A01K 7/06* (2006.01)
*A01K 7/02* (2006.01)
(Continued)

(52) U.S. Cl.
CPC ............ *A01K 7/06* (2013.01); *A01K 7/022* (2013.01); *A01K 7/025* (2013.01); *B67D 1/0004* (2013.01); *B67D 1/0875* (2013.01)

(58) Field of Classification Search
USPC ......... 119/74, 72, 75, 76, 77, 78, 79, 80, 73, 119/51.5; D30/121, 132
See application file for complete search history.

(56) References Cited

U.S. PATENT DOCUMENTS 1,218,969 A   3/1917   Ziener
1,512,629 A   10/1924  Mueller et al.
(Continued)

FOREIGN PATENT DOCUMENTS

CA   2082083   5/1994
CA   2587229   5/2006
(Continued)

OTHER PUBLICATIONS

Chinese Office Action dated May 21, 2021 issued in CN Application No. 201910888661.5.
(Continued)

*Primary Examiner* — Andrea M Valenti
(74) *Attorney, Agent, or Firm* — KED & ASSOCIATES, LLP

(57) ABSTRACT

A pet water dispenser may include a water tank having an opening, a pump provided inside the water tank, a water supply pipe connected to the pump to transport water, a water supply plate supplying water from the water supply pipe, and an illumination assembly to illuminate water falling from the water supply plate.

18 Claims, 10 Drawing Sheets

(51) Int. Cl.
*B67D 1/00* (2006.01)
*B67D 1/08* (2006.01)

(56) References Cited

U.S. PATENT DOCUMENTS

| | | | |
|---|---|---|---|
| 2,103,653 A | 12/1937 | Weil | |
| 2,510,446 A | 6/1950 | Weil | |
| 3,076,435 A | 2/1963 | Seymour | |
| 3,303,824 A | 2/1967 | Anderson | |
| 3,441,003 A | 4/1969 | Du Mond et al. | |
| D221,755 S | 9/1971 | Johnson | |
| 3,691,787 A * | 9/1972 | Kaufmann | B67D 1/0875 |
| | | | 62/400 |
| 4,100,885 A | 7/1978 | Kapplinger | |
| 4,133,456 A | 1/1979 | Corini | |
| 4,286,546 A | 9/1981 | Moore | |
| 4,561,384 A | 12/1985 | Liff | |
| 4,640,226 A | 2/1987 | Liff | |
| 4,932,561 A | 6/1990 | Boxall | |
| 5,031,689 A | 7/1991 | Jones et al. | |
| 5,105,771 A | 4/1992 | Schafer | |
| 5,140,134 A | 8/1992 | Reusche et al. | |
| 5,174,245 A | 12/1992 | Bishop | |
| 5,205,242 A | 4/1993 | Kasselman | |
| 5,209,069 A | 5/1993 | Newnan | |
| 5,345,063 A | 9/1994 | Reusche et al. | |
| 5,601,199 A | 2/1997 | Marty | |
| 5,699,669 A | 12/1997 | Gebhard | |
| 5,782,094 A | 7/1998 | Freeman | |
| 5,791,287 A | 8/1998 | Gruber | |
| 5,799,609 A | 9/1998 | Burns et al. | |
| 5,845,605 A | 12/1998 | Malamphy | |
| 5,862,669 A | 1/1999 | Davis | |
| 5,884,582 A | 3/1999 | Duckworth | |
| 5,941,077 A | 8/1999 | Safyan | |
| 6,003,318 A | 12/1999 | Busick | |
| 6,230,653 B1 | 5/2001 | Tobin | |
| 6,460,483 B1 | 10/2002 | Northrop et al. | |
| 6,622,657 B2 | 9/2003 | Northrop et al. | |
| 6,644,037 B2 | 11/2003 | Busick | |
| 6,705,540 B2 | 3/2004 | Koshiyama et al. | |
| 6,848,392 B1 | 2/2005 | Kreutzer, Jr. | |
| 7,089,881 B2 | 8/2006 | Plante | |
| 7,270,082 B2 | 9/2007 | Plante | |
| 7,549,395 B2 | 6/2009 | Stenberg | |
| 7,600,486 B2 | 10/2009 | Ellis | |
| 7,743,698 B2 | 6/2010 | Muir et al. | |
| 7,823,538 B1 | 11/2010 | Merager | |
| 7,958,844 B1 | 6/2011 | Northrop | |
| 8,117,991 B1 | 2/2012 | Civitillo | |
| 8,210,447 B2 | 7/2012 | Cohen | |
| 8,387,566 B2 | 3/2013 | Graves et al. | |
| 8,770,147 B2 | 7/2014 | Rowe | |
| 8,770,148 B2 | 7/2014 | Lipscomb et al. | |
| 9,035,222 B2 | 5/2015 | Alexander | |
| D738,579 S | 9/2015 | Owens et al. | |
| D755,449 S | 5/2016 | Cornwell, Jr. et al. | |
| 9,497,930 B2 | 11/2016 | Lipscomb et al. | |
| 1,243,126 A1 | 10/2017 | Ziener | |
| D819,898 S | 6/2018 | Poisson et al. | |
| 10,165,753 B1 * | 1/2019 | Huang | A01K 7/02 |
| 11,154,034 B2 * | 10/2021 | Youn | B01D 35/26 |
| 11,160,250 B2 * | 11/2021 | Yoo | A01K 7/027 |
| 11,590,438 B2 | 2/2023 | Yoo | |
| 2002/0020673 A1 | 2/2002 | Nohren et al. | |
| 2003/0115902 A1 | 6/2003 | Busick et al. | |
| 2003/0140864 A1 | 7/2003 | Wenstrand | |
| 2003/0213437 A1 | 11/2003 | Norris | |
| 2005/0166853 A1 * | 8/2005 | Plante | A01K 5/0114 |
| | | | 119/74 |
| 2006/0174838 A1 | 8/2006 | Plante | |
| 2006/0231040 A1 | 10/2006 | Bast et al. | |
| 2006/0283972 A1 | 12/2006 | Muir et al. | |
| 2006/0288947 A1 * | 12/2006 | Perlsweig | A01K 7/022 |
| | | | 119/75 |
| 2007/0045159 A1 | 3/2007 | Lee | |
| 2007/0095297 A1 * | 5/2007 | Boyd | A01K 7/022 |
| | | | 119/74 |
| 2007/0199512 A1 | 8/2007 | Ellis | |
| 2007/0227456 A1 | 10/2007 | Borey | |
| 2008/0078330 A1 | 4/2008 | McCallum et al. | |
| 2008/0169249 A1 | 7/2008 | Ter Stege | |
| 2008/0190374 A1 | 8/2008 | Farris | |
| 2008/0257272 A1 | 10/2008 | Bolda | |
| 2009/0078209 A1 | 3/2009 | Kroeker | |
| 2009/0126641 A1 | 5/2009 | Anderson et al. | |
| 2009/0218985 A1 | 9/2009 | Hallett | |
| 2010/0095897 A1 | 4/2010 | Rowe | |
| 2010/0276508 A1 * | 11/2010 | Davies | B05B 17/085 |
| | | | 239/18 |
| 2010/0300366 A1 | 12/2010 | Lipscomb et al. | |
| 2011/0067638 A1 | 3/2011 | Lipscomb et al. | |
| 2011/0102945 A1 | 5/2011 | Isono et al. | |
| 2011/0214613 A1 | 9/2011 | Diamond | |
| 2011/0226470 A1 | 9/2011 | Latrille et al. | |
| 2011/0259273 A1 | 10/2011 | Lipscomb et al. | |
| 2012/0017839 A1 | 1/2012 | Veness et al. | |
| 2012/0111280 A1 | 5/2012 | Shin et al. | |
| 2012/0216751 A1 | 8/2012 | Rowe | |
| 2013/0087102 A1 | 4/2013 | Lipscomb et al. | |
| 2013/0092090 A1 | 4/2013 | McCallum | |
| 2013/0175802 A1 * | 7/2013 | Breau | A61H 33/005 |
| | | | 290/54 |
| 2013/0192529 A1 | 8/2013 | Kruger et al. | |
| 2013/0200064 A1 | 8/2013 | Alexander | |
| 2013/0228132 A1 | 9/2013 | Lipscomb et al. | |
| 2013/0255280 A1 | 10/2013 | Murphy et al. | |
| 2014/0033984 A1 | 2/2014 | Li et al. | |
| 2014/0053781 A1 | 2/2014 | Lewis | |
| 2014/0076242 A1 | 3/2014 | Ho | |
| 2014/0165607 A1 | 6/2014 | Alexander | |
| 2014/0251223 A1 | 9/2014 | Rowe et al. | |
| 2014/0353335 A1 | 12/2014 | Van Diepen | |
| 2015/0135728 A1 | 5/2015 | Swanson et al. | |
| 2015/0189862 A1 | 7/2015 | Lipscomb | |
| 2015/0196157 A1 | 7/2015 | Swisth | |
| 2015/0276204 A1 * | 10/2015 | Ray | F21S 6/001 |
| | | | 239/20 |
| 2015/0313180 A1 | 11/2015 | Lipscomb et al. | |
| 2015/0353335 A1 | 12/2015 | Breault | |
| 2016/0000037 A1 | 1/2016 | Lipscomb et al. | |
| 2016/0099599 A1 | 4/2016 | Ho et al. | |
| 2016/0113249 A1 | 4/2016 | Kuo | |
| 2016/0118179 A1 | 4/2016 | Park et al. | |
| 2016/0159633 A1 | 6/2016 | Diffenderfer | |
| 2016/0286757 A1 | 10/2016 | Armstrong | |
| 2016/0287363 A1 | 10/2016 | Miller | |
| 2017/0245465 A1 | 8/2017 | Oates et al. | |
| 2017/0255486 A1 * | 9/2017 | Ryznar | G05B 19/418 |
| 2018/0054073 A1 | 2/2018 | Olson et al. | |
| 2018/0160648 A1 | 6/2018 | Goh | |
| 2018/0177325 A1 | 6/2018 | Lyons et al. | |
| 2019/0075755 A1 | 3/2019 | Imaizumi et al. | |
| 2019/0140471 A1 | 5/2019 | Johanski et al. | |
| 2019/0162460 A1 | 5/2019 | Oh | |
| 2019/0227580 A1 | 7/2019 | von der Assen et al. | |
| 2019/0239476 A1 | 8/2019 | Mai et al. | |
| 2019/0239491 A1 | 8/2019 | Yu et al. | |
| 2019/0357747 A1 | 11/2019 | Keiler, III | |
| 2020/0303971 A1 | 9/2020 | Hall et al. | |
| 2020/0337266 A1 | 10/2020 | Yu et al. | |
| 2020/0355751 A1 | 11/2020 | Swaans et al. | |

FOREIGN PATENT DOCUMENTS

| | | |
|---|---|---|
| CH | 711714 | 1/2022 |
| CN | 2322412 | 6/1999 |
| CN | 2351955 | 12/1999 |
| CN | 1701206 | 11/2005 |
| CN | 2776044 | 5/2006 |
| CN | 1824622 | 8/2006 |
| CN | 1870903 | 11/2006 |
| CN | 200994393 | 12/2007 |

(56) References Cited

FOREIGN PATENT DOCUMENTS

| | | | | |
|---|---|---|---|---|
| CN | 200994394 | 12/2007 | | |
| CN | 201365463 | 12/2009 | | |
| CN | 201422313 | 3/2010 | | |
| CN | 201530253 | * 7/2010 | ............. | B44C 5/06 |
| CN | 101790970 | 8/2010 | | |
| CN | 201541568 | 8/2010 | | |
| CN | 101816289 | 9/2010 | | |
| CN | 101841191 | 9/2010 | | |
| CN | 102072468 | 5/2011 | | |
| CN | 102480927 | 5/2012 | | |
| CN | 102600661 | 7/2012 | | |
| CN | 202310894 | 7/2012 | | |
| CN | 102925877 | 2/2013 | | |
| CN | 102934044 | 2/2013 | | |
| CN | 202722224 | 2/2013 | | |
| CN | 202873523 | 4/2013 | | |
| CN | 203136752 | 8/2013 | | |
| CN | 203544552 | 4/2014 | | |
| CN | 203618522 | 6/2014 | | |
| CN | 103917147 | 7/2014 | | |
| CN | 103931515 | 7/2014 | | |
| CN | 203913286 | 11/2014 | | |
| CN | 204707695 | 10/2015 | | |
| CN | 204722018 | 10/2015 | | |
| CN | 105265331 | 1/2016 | | |
| CN | 205005702 | 2/2016 | | |
| CN | 105792644 | 7/2016 | | |
| CN | 205431490 | 8/2016 | | |
| CN | 105923696 | 9/2016 | | |
| CN | 205682161 | 11/2016 | | |
| CN | 106172064 | 12/2016 | | |
| CN | 106212310 | 12/2016 | | |
| CN | 205830734 | 12/2016 | | |
| CN | 106332801 | 1/2017 | | |
| CN | 205884322 | 1/2017 | | |
| CN | 106787233 | 5/2017 | | |
| CN | 206142936 | 5/2017 | | |
| CN | 206227319 | 6/2017 | | |
| CN | 106962218 | 7/2017 | | |
| CN | 206314381 | 7/2017 | | |
| CN | 107041318 | 8/2017 | | |
| CN | 107124043 | 9/2017 | | |
| CN | 107259458 | 10/2017 | | |
| CN | 107509653 | 12/2017 | | |
| CN | 206699096 | 12/2017 | | |
| CN | 206760412 | 12/2017 | | |
| CN | 206760441 | 12/2017 | | |
| CN | 107568092 | 1/2018 | | |
| CN | 206851699 | 1/2018 | | |
| CN | 107660756 | 2/2018 | | |
| CN | 206949206 | 2/2018 | | |
| CN | 107821202 | 3/2018 | | |
| CN | 107897027 | 4/2018 | | |
| CN | 207268238 | 4/2018 | | |
| CN | 107969351 | 5/2018 | | |
| CN | 207411173 | 5/2018 | | |
| CN | 207443927 | 6/2018 | | |
| CN | 207519400 | 6/2018 | | |
| CN | 108271728 | 7/2018 | | |
| CN | 108348966 | 7/2018 | | |
| CN | 108353810 | 8/2018 | | |
| CN | 108377928 | 8/2018 | | |
| CN | 108464253 | 8/2018 | | |
| CN | 207740217 | 8/2018 | | |
| CN | 207803161 | 9/2018 | | |
| CN | 207870035 | 9/2018 | | |
| CN | 109513315 | 3/2019 | | |
| CN | 109997713 | 7/2019 | | |
| DE | 20 2016 107 252 | 3/2018 | | |
| EP | 0 894 430 | 2/1999 | | |
| EP | 1 188 995 | 3/2002 | | |
| EP | 1 566 099 | 8/2005 | | |
| EP | 3 315 022 | 5/2018 | | |
| EP | 3 520 607 | 8/2019 | | |
| FR | 2 726 452 | 5/1996 | | |
| GB | 2 458 173 | 9/2009 | | |
| GB | 2574921 | 12/2019 | | |
| JP | H05-118725 | 5/1993 | | |
| JP | H07-269800 | 10/1995 | | |
| JP | 2012-188163 | 10/2012 | | |
| JP | 3200546 | 10/2015 | | |
| JP | 2017-148018 | 8/2017 | | |
| JP | 2018-057340 | 4/2018 | | |
| KR | 10-0835557 | 6/2008 | | |
| KR | 10-2010-0046615 | 5/2010 | | |
| KR | 101116332 | * 3/2012 | ............. | B05B 17/08 |
| KR | 20130136123 | * 12/2013 | ........... | A61L 2/0047 |
| KR | 10-2014-0042949 | 4/2014 | | |
| KR | 20-0475039 | 11/2014 | | |
| KR | 10-2017-0003154 | 1/2017 | | |
| KR | 10-2017-0017718 | 2/2017 | | |
| KR | 10-1825334 | 2/2018 | | |
| KR | 10-1898661 | 9/2018 | | |
| RU | 2650560 | 4/2018 | | |
| TW | 201641007 | 12/2016 | | |
| TW | I 574614 | 3/2017 | | |
| WO | WO 2009/016604 A1 | * 2/2009 | ............. | G02B 27/14 |
| WO | WO 2010/138799 | 12/2010 | | |
| WO | WO 2011/035320 | 3/2011 | | |
| WO | WO 2013/012943 | 1/2013 | | |
| WO | WO 2014209159 A1 | * 12/2014 | ................ | B26J 6/20 |
| WO | WO 2017/185053 | 10/2017 | | |

OTHER PUBLICATIONS

European Search Report dated Feb. 24, 2020 issued in EP Application No. 19198289.1.
Chinese Office Action dated Mar. 31, 2021 issued in CN Application No. 201910886533.7.
United States Office Action dated May 11, 2021 issued in co-pending related U.S. Appl. No. 16/571,093.
European Search Report dated Feb. 3, 2020 issued in EP Application No. 19198170.3.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
United States Office Action dated Mar. 30, 2021 issued in co-pending related U.S. Appl. No. 16/571,090.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.

(56) References Cited

OTHER PUBLICATIONS

Chinese Office Action issued in Application No. 201910888721.3 dated Apr. 22, 2021.
Chinese Office Action issued in Application No. 201910888102.4 dated Apr. 26, 2021.
United States Office Action dated Apr. 27, 2021 issued in co-pending related U.S. Appl. No. 16/569,841.
United States Office Action dated Apr. 27, 2021 issued in co-pending related U.S. Appl. No. 16/574,418.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
United States Office Action dated Oct. 5, 2021 issued in co-pending related U.S. Appl. No. 16/571,074.
U.S. Appl. No. 16/569,841, filed Sep. 13, 2019.
Chinese Office Action dated May 17, 2021 issued in CN Application No. 201910889361.9.
Chinese Office Action dated May 10, 2021 issued in CN Application No. 201910888718.1.
U.S. Appl. No. 16/574,418, filed Sep. 18, 2019.
U.S. Appl. No. 16/571,090, filed Sep. 14, 2019.
European Search Report dated Apr. 23, 2020 issued in EP Application No. 19198303.0.
Chinese Office Action dated Mar. 30, 2021 issued in CN Application No. 201910886714.X.
European Search Report dated Apr. 9, 2020 issued in EP Application No. 19198174.5.
United States Office Action dated Jun. 2, 2020 issued in co-pending related U.S. Appl. No. 16/574,259.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.
European Search Report dated Feb. 27, 2020 issued in Application No. 19198292.5.
European Search Report dated Feb. 27, 2020 issued in Application No. 19198298.2.
U.S. Appl. No. 16/574,259, filed Sep. 18, 2019.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
United States Office Action dated Mar. 24, 2022 issued in co-pending related U.S. Appl. No. 16/571,089.
United States Office Action dated Feb. 11, 2022 issued in co-pending related U.S. Appl. No. 16/574,322.
Chinese Office Action dated Nov. 10, 2021 issued in CN Application No. 201910886714.X.
United States Office Action dated Feb. 1, 2022 issued in co-pending related U.S. Appl. No. 16/574,237.
Dong, CN108464253A Machine Translation Description, Aug. 31, 2018, obtained Jan. 13, 2022 (Year: 2018).
United States Office Action dated Mar. 14, 2022 issued in co-pending related U.S. Appl. No. 16/570,310.
United States Office Action dated Mar. 17, 2022 issued in co-pending related U.S. Appl. No. 16/574,581.
United States Office Action dated Dec. 10, 2021 issued in co-pending related U.S. Appl. No. 16/571,075.
United States Office Action dated Jun. 1, 2022 issued in co-pending related U.S. Appl. No. 16/571,075.
United States Office Action dated Jun. 2, 2022 issued in co-pending related U.S. Appl. No. 16/570,279.
United States Office Action dated Jun. 15, 2022 issued in co-pending related U.S. Appl. No. 16/569,908.
United States Office Action dated Jun. 23, 2022 issued in co-pending related U.S. Appl. No. 16/574,368.
United States Office Action dated Jul. 5, 2022 issued in co-pending related U.S. Appl. No. 16/574,240.
United States Office Action dated Jul. 7, 2022 issued in co-pending related U.S. Appl. No. 16/574,474.
United States Office Action dated Jul. 29, 2022 issued in co-pending related U.S. Appl. No. 16/574,322.
Chinese Notice of Allowance dated Apr. 8, 2022 issued in CN Application No. 201910888611.7.
United States Office Action dated Aug. 29, 2022 issued in co-pending related U.S. Appl. No. 16/571,245.
United States Office Action dated Oct. 11, 2022 issued in co-pending related U.S. Appl. No. 16/570,279.
United States Office Action dated Oct. 13, 2022 issued in co-pending related U.S. Appl. No. 16/571,089.
Rao et al. (2015). Effect of Corrugation Angle on Heat Transfer Studies of Viscous Fluids in Corrugated Plate Heat Exchangers. International Journal of Engineering and Technology Innovation, 5(2), pp. 99-107. (Year: 2015).
United States Office Action dated Feb. 23, 2023 issued in co-pending related U.S. Appl. No. 16/574,322.
United States Office Action dated Mar. 3, 2023 issued in co-pending related U.S. Appl. No. 16/574,474.
U.S. Appl. No. 16/574,219, filed Sep. 18, 2019.
U.S. Appl. No. 16/574,240, filed Sep. 18, 2019.
U.S. Appl. No. 16/574,237, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,089, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/570,279, filed Sep. 13, 2019.
U.S. Appl. No. 16/569,827, filed Sep. 13, 2019.
U.S. Appl. No. 16/569,908, filed Sep. 13, 2019.
Chinese Office Action dated Apr. 1, 2021 issued in CN Application No. 201910886305.X.
Chinese Office Action dated Apr. 9, 2021 issued in CN Application No. 201910886526.7.
U.S. Office Action dated Mar. 30, 2023 issued in U.S. Appl. No. 16/574,368.
Chinese Office Action dated Feb. 13, 2023 issued in Application No. 202210573950.8.
U.S. Office Action dated May 24, 2023 issued in U.S. Appl. No. 16/571,074.
U.S. Office Action dated Apr. 27, 2023 issued in U.S. Appl. No. 16/574,581.
U.S. Office Action dated Mar. 24, 2022 issued in co-pending U.S. Appl. No. 16/571,089.

* cited by examiner

LIQUID DISPENSER FOR ANIMALS

CROSS-REFERENCE TO RELATED APPLICATION

This application claims priority under 35 U.S.C. § 119 to U.S. Provisional Application No. 62/733,393 filed on Sep. 19, 2018, and Korean Application Nos. 10-2019-0059514 filed on May 21, 2019, 10-2018-0132642 and 10-2018-0132644 filed on Nov. 1, 2018 whose entire disclosure(s) is/are hereby incorporated by reference.

BACKGROUND

1. Field

A liquid dispenser to supply liquid to an animal, e.g., a pet, is disclosed herein.

2. Background

In recent years, the population of people raising a pet has increased, in addition attachment and interest in pets. Like most animals, pets must drink water to survive and maintain a biorhythm. Since pets are often left alone and since communication with their owners is difficult, the demand for pet water dispensers or water supply devices has increased.

Also, flowing water has a larger surface area in contact with outside air than stored water or water sitting in a bowl, so flowing water may contain more oxygen. Pets prefer fresh flowing water to water in a bowl due to the higher oxygen content. Accordingly, there is a need for pet water dispensers that provide flowing water.

During rainy seasons and winter, pets may not be able to go outside as much due to the weather. Like people, pets may also experience seasonal depression or seasonal affective disorder (SAD) when they are less exposed to sunlight.

European Patent No. 3315022 A1, US Publication No. 2014/0053781, and Korean Patent No. 10-1825334 B1 disclose drinking bowls for pets. However, such drinking bowls have various disadvantages, which the present disclosure solves.

The above references are incorporated by reference herein where appropriate for appropriate teachings of additional or alternative details, features and/or technical background.

DETAILED DESCRIPTION OF THE INVENTION

A pet water dispenser may store water in a water tank or storage chamber 10, and a pump 20 may supply stored water to a water supply plate or upper plate 30. The water from the water supply plate 30 may be circulated back to the water tank 10.

Figure 1:
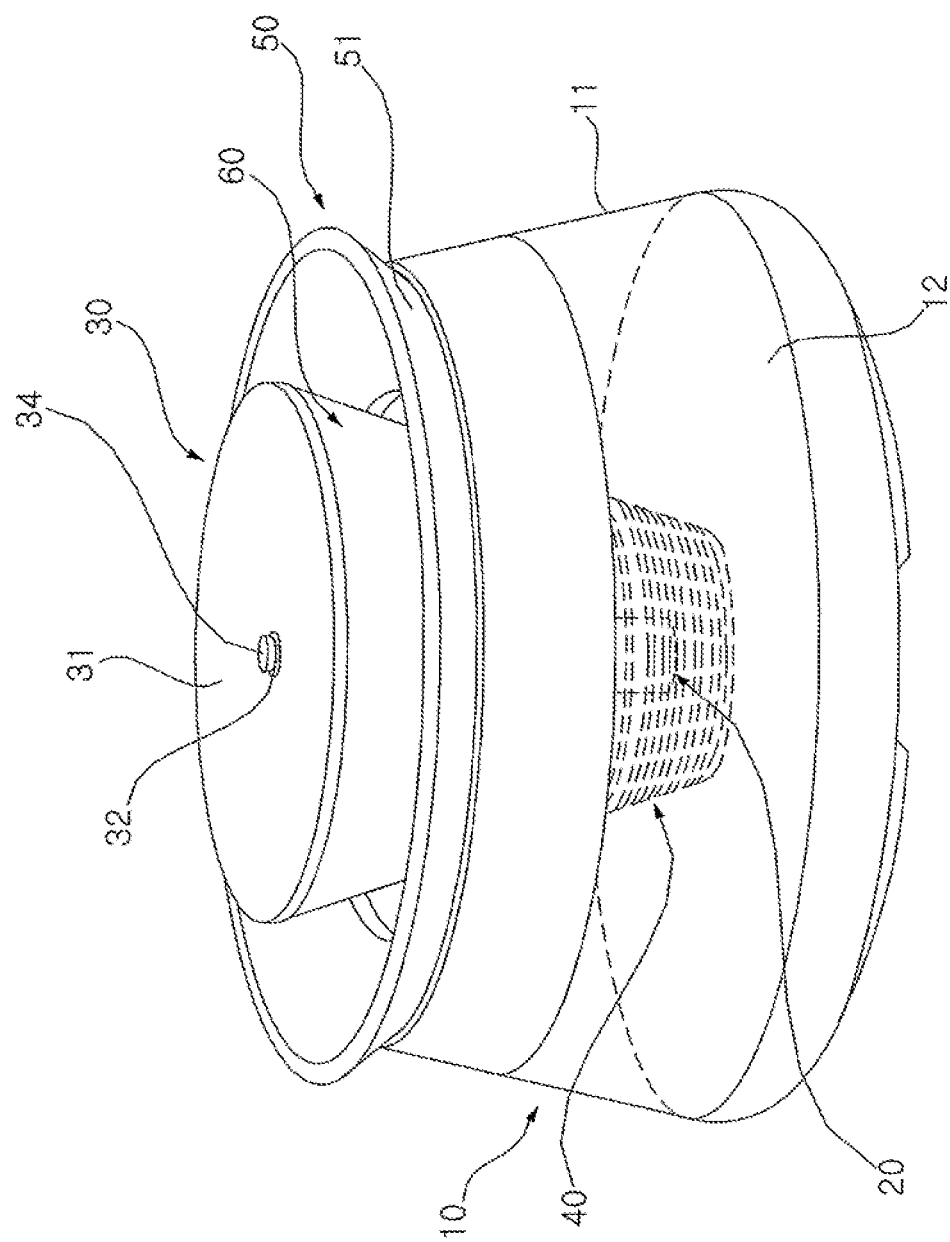
FIG. 1 is a perspective view showing a pet water dispenser according to an embodiment.
Figure 2:
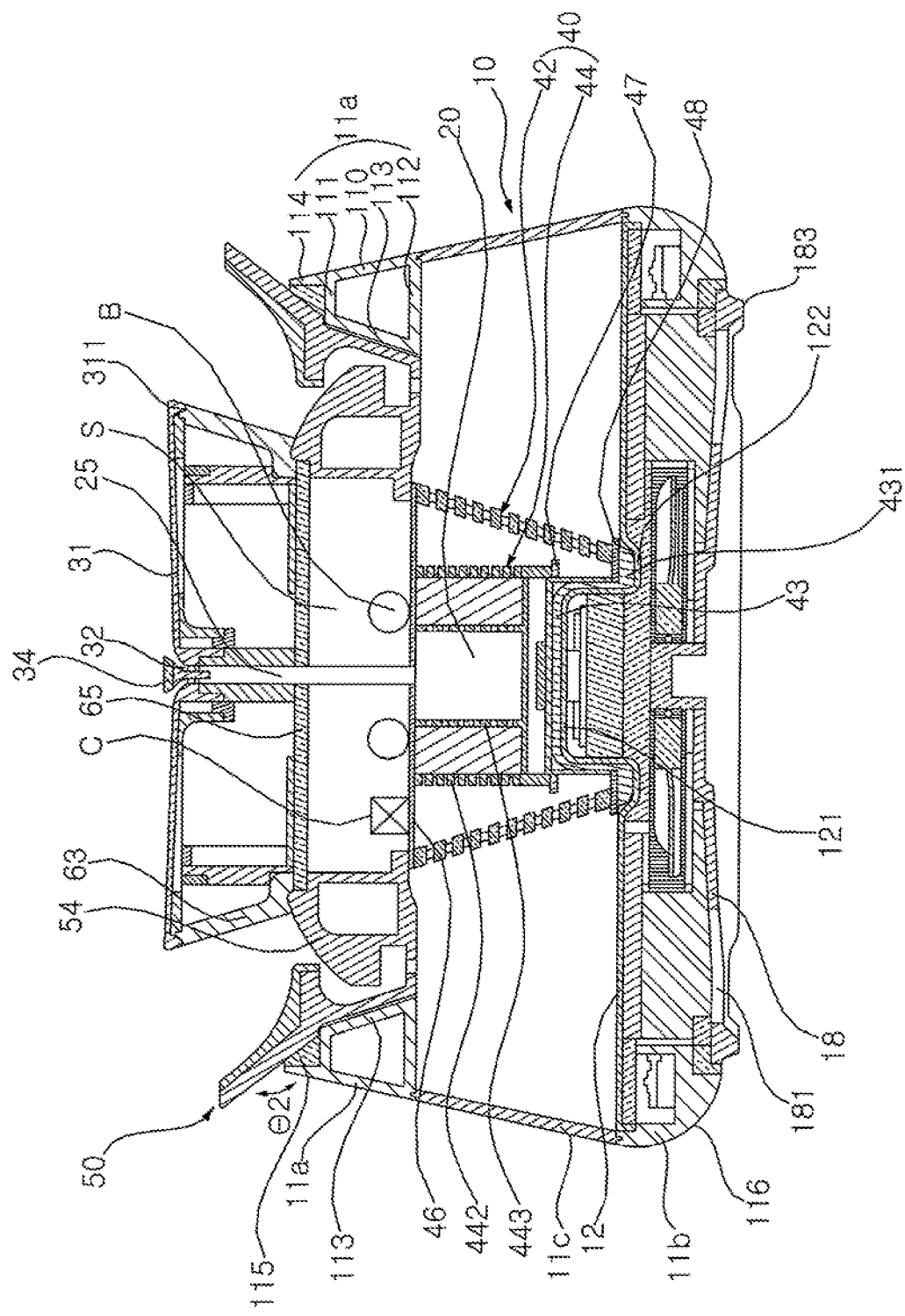
FIG. 2 is a cross-sectional view of the pet water dispenser shown in FIG. 1.

Referring to FIGS. 1 and 2, the pet water dispenser may further include an illumination assembly 60 that irradiates light toward an outside of the pet water dispenser. In addition, a water supply pipe 25 may be connected to the pump and the water supply plate 30 to supply water to the water supply plate 30. The illumination assembly 60 will be described in further detail with reference to FIGS. 5-7.

The pump 20 may be installed or located inside the water tank 10 to pump the water stored in the water tank 10. A filter or filter assembly 40 may be installed in the water tank 10 to filter foreign substances contained in the water before the water stored in the water tank 10 flows into the pump 20.

The water supply pipe 25 may be connected to the pump 20 and the water supply plate 30 so that the water pumped by the pump 20 may be transferred to the water supply plate 30. The water supply plate 30 may be provided to be higher than the water tank 10.

The water supply plate 30 may include an upper surface or plate body 31 having a water supply hole 32 formed therein. The water supply hole 32 may communicate with the water supply pipe 25. The water flowing along the water supply pipe 25 may be supplied to the plate body 31 through the water supply hole 32. The plate body 31 may have a flat upper surface 310. The water supplied through the water supply hole 32 may flow over the upper surface 310 of the plate body 31 toward an edge 311 of the plate body 31.

The plate body 31 may be provided above the water tank 10. The water flowing along the upper surface 310 of the plate body 31 may drop downward from the edge 311 of the plate body 31 toward the water tank 10. The water tank 10 may have an opened upper side or an opened top. The water dropped from the water supply plate 30 may be stored in the water tank 10.

A water receiver or a water guide 50 may be provided between the water tank 10 and the water supply plate 30. The water guide 50 may receive the water dropped from the water supply plate 30 and drain the water back to the water tank 10. The water guide 50 may be arranged to be vertically spaced apart from the water supply plate 30. The water guide 50 may also be referred to as a splash guard or a drip tray.

The illumination assembly 60 may extend between the water supply plate 30 and the water guide 50. The illumination assembly 60 may partially form an outer appearance of the pet water dispenser. The illumination assembly 60 may irradiate light toward an outside and enhance an appearance of the pet water dispenser. The illumination assembly 60 may illuminate water falling from the water supply plate 30 to the water tank 10.

In addition, the pet water dispenser may include a power supply device and at least one sensor such as a water level sensor, a water temperature sensor 85 (e.g., a thermometer), a proximity sensor 87, a gyro sensor, and a pollution level or contamination sensor 82, which will be described in detail with reference to FIG. 3.

Figure 3:
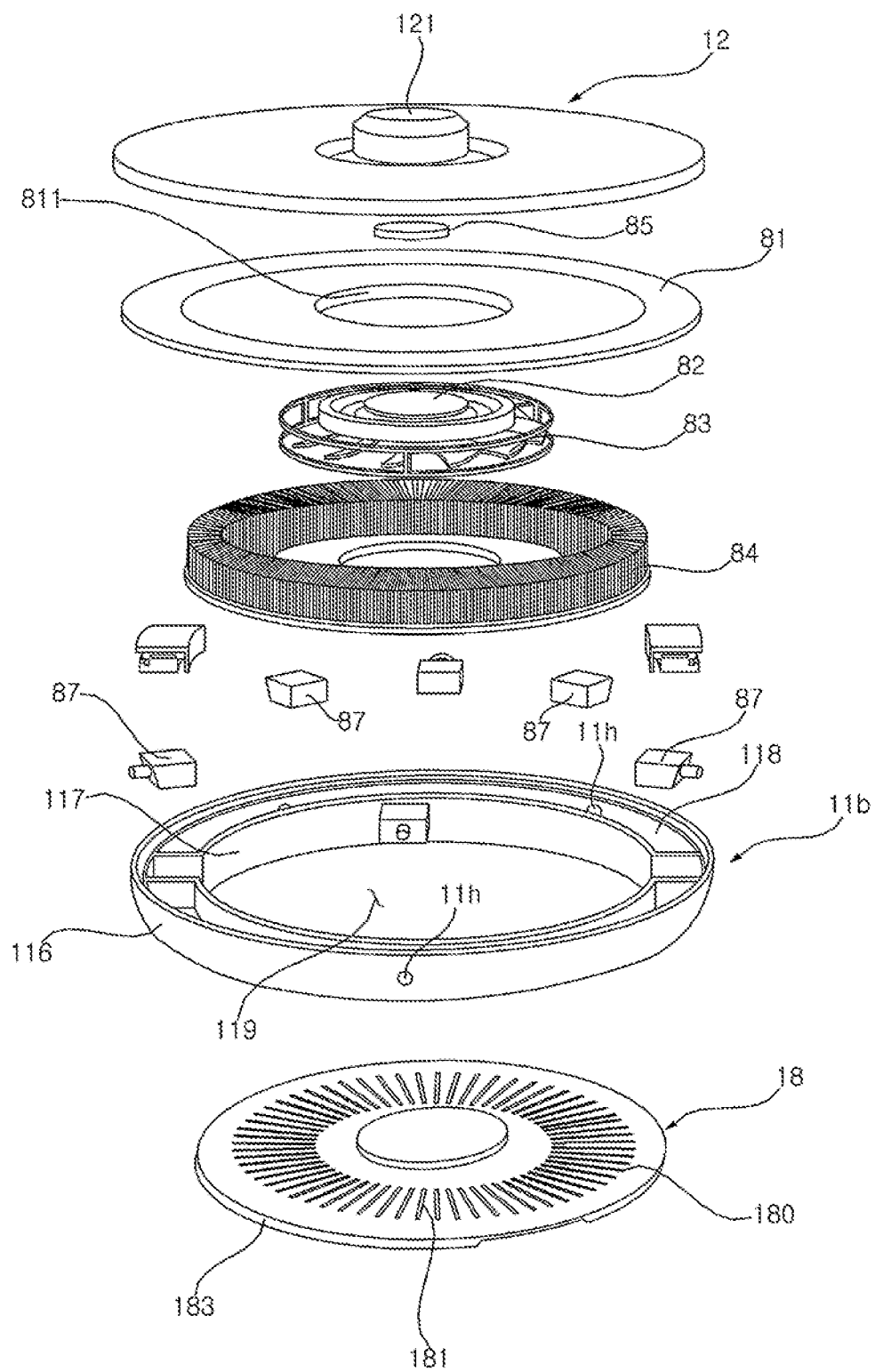
FIG. 3 is an exploded perspective view showing a space within a bottom plate, base, and lower wall.

Referring to FIGS. 1-3, the water tank 10 may include a wall 11 having a main or middle wall 11c, and an upper wall 11a and a container support 11b coupled to upper and lower sides of the main wall 11c, respectively. A bottom plate 12 may be provided between the main wall and container support 11c and 11b. The main and upper walls 11c and 11a may form a container of the water tank 10 in which water is stored, while the container support 11b may provide a sealed space below the bottom plate 12 in which electronic devices or sensors (e.g., the water temperature sensor 85 or the proximity sensor 87) may be housed. The container support lib may also be referred to as a container base or a lower wall.

The water tank 10 may include one container that stores water, as exemplified in the figures. In this case, the water stored in the water tank 10 may be supplied to the water supply plate 30 through the pump 20 and recovered to the water tank 10 again. Alternatively, the water tank 10 may include a first water container or tank in which purified water is stored, and a second water container or tank in which water dropped from the water supply plate 30 is stored. Hereinafter, the case where one water tank 10 is provided will be described as an example for convenience of description, but the present disclosure is not limited thereto.

The container of the water tank 10 formed by the upper and main walls 11a and 11c may be formed in a cylindrical or truncated cone shape having a receding diameter from a bottom end of the main wall 11c to a top end of the upper wall 11a, but may be formed in various shapes without being limited thereto. The upper wall 11a may be formed to extend upward from the main wall 11c.

A first protruding plate 111 and a second protruding plate 112 may protrude from an inner surface of the upper wall 11a toward a center of the water tank 10. The first and second protruding plates 111 and 112 may extend in a horizontal direction and may be spaced apart from each other in a vertical direction. The second protruding plate 112 protrude further inward than the first protruding plate 111, and may have a length longer than a length of the first protruding plate 111.

An inner inclined surface or inner tank wall 113 inclined inward toward a center of the water tank 10 from a top end to a bottom end may be formed between inner ends of the first and second protruding plates 111 and 112. The inner tank wall 113 may extend between the inner ends of the first and second protruding plates 111 and 112, and may have a predetermined inclination. Lengths and positions of the first and second protruding plates 111 and 112 and/or an inclination of the upper wall 11a may be configured to set the predetermined inclination of the inner tank wall 113.

A wall portion or outer surface 110 of the upper wall 11a may extend in the same direction as the main wall 11c. The upper wall 11a may have a same or similar inclination as the main wall 11c to give a seamless appearance. The upper wall 11a may protrude upward from the main wall 11c.

The upper wall 11a may be formed with an upward protruding wall or extension 114 protruded upward from the first protrusion 111. A bumper 115 may be attached on the extension 114 and/or the first protrusion 111. The bumper 115 may be formed of an elastic material (e.g., rubber) and may be referred to as packing or cushioning.

The first protruding plate 111, along with the extension 114 may support an upper inclined surface 513 of an outer wall or outer guide wall 51 of the water guide 50, while the inner tank wall 113 may support a lower inclined surface 514 of the water guide 50. In addition, the bumper 115 may contact or support the upper inclined surface 513 of the outer guide wall 51. Details of the water guide 50 will be described later with reference to FIG. 8.

A tubular convex protrusion or projection 121 may be formed at a center of the bottom plate 12 so as to protrude upward. A ring-shaped groove or recess 122 may be formed on the bottom surface 12 to surround the protrusion 121. A lower filter cover 43 provided on a lower end of the filter assembly 40 may be inserted into the groove 122 so that the filter assembly 40 and the pump 20 may be stably supported in the water tray 10.

The container support 11b may have an outer circumferential surface 116 forming a lower outer surface of the water tank 10 and a mounting portion 117 provided on an inner side of the container support 11b opposite the outer circumferential surface 116. The outer circumferential surface 116 may curve downward from the lower end of the main wall 11c to have a convex curvature. The mounting portion 117 may form a space 119 between the bottom plate 12 and a base 18 provided below the bottom plate 12 and the container support 11b. The base 18 may separate the container support 11b from a floor or ground surface where the pet water dispenser may be placed.

The base 18 may include a base plate 180 covering a bottom of the space 119. Ventilation holes or openings 181 may be formed in the base plate 180. The ventilation holes 181 may also be referred to as vents. A plurality of ventilation holes 181 may be radially arranged along a circumferential direction of the base 18. Air may be suctioned into the container support 11b via the ventilation holes 181, and hot air may be exhausted out of an outermost portion of the ventilation holes 181. Alternatively or addition thereto, there may also be ventilation holes provided on a side or corner of the container support 11b through which hot air may exhaust.

The base 18 may include at least one base leg 183 protruding downward from the base plate 180. A plurality of base legs 183 may be spaced apart from each other in the circumferential direction of the base 18.

Pets may prefer to drink water between 10 and 20 degrees Celsius. The pet water dispenser may include a water temperature regulator in the space 19 to supply water of a predetermined temperature preferred by the pet.

The water temperature regulator may include a thermoelectric element 81 for controlling a temperature of the water stored in the water tank 10 and maintaining the water temperature at a predetermined temperature. The thermoelectric element 81 may be a Peltier device or a thermoelectric cooler (TEC). A motor 82 may be provided in a hollow center or hole 811 of the thermoelectric element 81. A heat radiating fan 83 operated by the motor 82 may be installed below the motor 82. A heat sink 84 having a plurality of radiating fins provided on a heat diffusing or dissipation plate may be provided around the fan 83.

The water temperature sensor 85 may be installed in an inner space inside the protrusion 121 below the bottom plate 12, and the bottom plate 12 may be made of a material having a high thermal conductivity (e.g., metal or stainless steel). Alternatively or in addition thereto, the water temperature sensor 85 may at least partially protrude through the bottom plate 12 to directly contact water stored in the water container of the water tank 10. The water temperature sensor 85 may sense a temperature of the water in the water tank 10. If the temperature of the water sensed by the water temperature sensor 85 is not within a predetermined temperature range, the thermoelectric element 81 may be operated to cool the water or heat the water. Heat generated in the thermoelectric element 81 may be dissipated to an outside by the fan 83 and the heat sink 84.

The container support 11b may be formed with a mounting space or recess 118 having a predetermined width in a mounting portion 117. The mounting space 118 may form an opening or space between the outer circumferential surface 116 and an inner circumferential surface of the mounting portion 117. The thermoelectric element 81 may be provided over the mounting space 118 and the space 119 provided on an inner side of the mounting portion 117.

The proximity sensor 87 may be installed inside the space formed by the edge surface 118 of the container support 11b. A signal (e.g., laser) from the proximity sensor 87 may be transmitted through a signal transmission membrane provided in a hole 11h formed in the outer circumferential surface 116. The proximity sensor 87 may sense a pet within a predetermined distance range, and may continuously sense a position of the pet to sense whether the pet is approaching the pet water dispenser. There may be a plurality of proximity sensors 87. The plurality of proximity sensors 87 may be spaced apart from each other along a circumference of the edge surface 118. Each of the plurality of proximity sensors 87 may sense a pet to determine multiple pets approaching the pet water dispenser.

The filter assembly 40 may include a first filter 42 and a second filter 44, and may further include first and second ultraviolet (UV) filters or lights 47 and 48. Details of the first and second UV filters 47 and 48 may be found in U.S. application Ser. No. 16/571,074 filed on Sep. 14, 2019 and Ser. No. 16/571,075 filed on Sep. 14, 2019, the entire contents of which are incorporated by reference herein.

The first filter 42 may be formed in a cylindrical or truncated cone shape and may be made of a rigid material (e.g., metal such as stainless steel). A plurality of water inlets or through holes may be formed in a wall of the first filter 42. The wall of the first filter 42 may have a diameter that increases from a lower end to an upper end.

The first filter 42 may include a lower filter cover 43 provided on a lower end. The lower filter cover 43 may be formed to be convex upward so as to cover the protrusion 121 formed on the bottom plate 12. An inner surface of the lower filter cover 43 may have a shape to correspond to an outer surface contour of the protrusion 121. The lower filter cover 43 may have a flange 431 extending from its edge which may be inserted into the groove 122 formed around the protrusion 121. The first filter 42 may stably remain in a predetermined position without being moved horizontally or laterally in the water tank 10. There may further be a support cylinder provided below the second filter 44 in which the lower filter cover 43 is inserted.

The second filter 44 may be provided in a hollow portion (i.e., inside of) of the first filter 42. The pump 20 may be installed inside an inner space of the second filter 44. The second filter 44 may include an outer wall 442 formed with a plurality of through holes and an inner wall 443 spaced apart from the outer wall 442 and also having a plurality of through holes. A space formed between the inner and outer walls 442 and 443 may be filled with a filtration material 45 (e.g., carbon filter).

An upper filter cover 46 may be provided on upper ends of the first and second filter filters 42 and 44. The water supply pipe 25 may penetrate through the upper filter cover 46. The upper filter cover 46 may seal an upper portion of the pump 20 and the first and second filter filters 42 and 44. The first and second filters 42 and 44 and the upper filter cover 46 may be permanently or stably coupled to each other (e.g., adhered, fused, or welded). Alternatively, the first and second filters 42 and 44 and the upper filter cover 46 may be assembled to be detachable from each other by known engaging means such as an arm, hook, or screw threads.

The pump 20 may be installed in a space formed inside the inner wall 443 of the second filter 44. Accordingly, a filtration performance and a pumping efficiency may be improved as compared with a case where the filter is provided on one side of the pump. Further, a separate structure to fix or hold the pump 20 at a predetermined position is not required.

The water that has passed through the first and second filters 42 and 44 may be suctioned into the pump 20 through the through holes formed in the inner wall 443 of the second filter 44 and discharged to the water supply pipe 25. The pump 20 may include a motor therein. The motor may be a motor whose rotational speed may be varied. A control module or controller C, which will be described later, may control the rotational speed of the motor so as to vary the capacity or pumping rate of the pump 20 to pump the water stored in the water tank 10. When a large number of pets consume water at the same time (which may be determined via the plurality of proximity sensors 87), the controller C may speed up the rotation speed of the motor and increase the pumping capacity of the pump 20.

Figure 6:
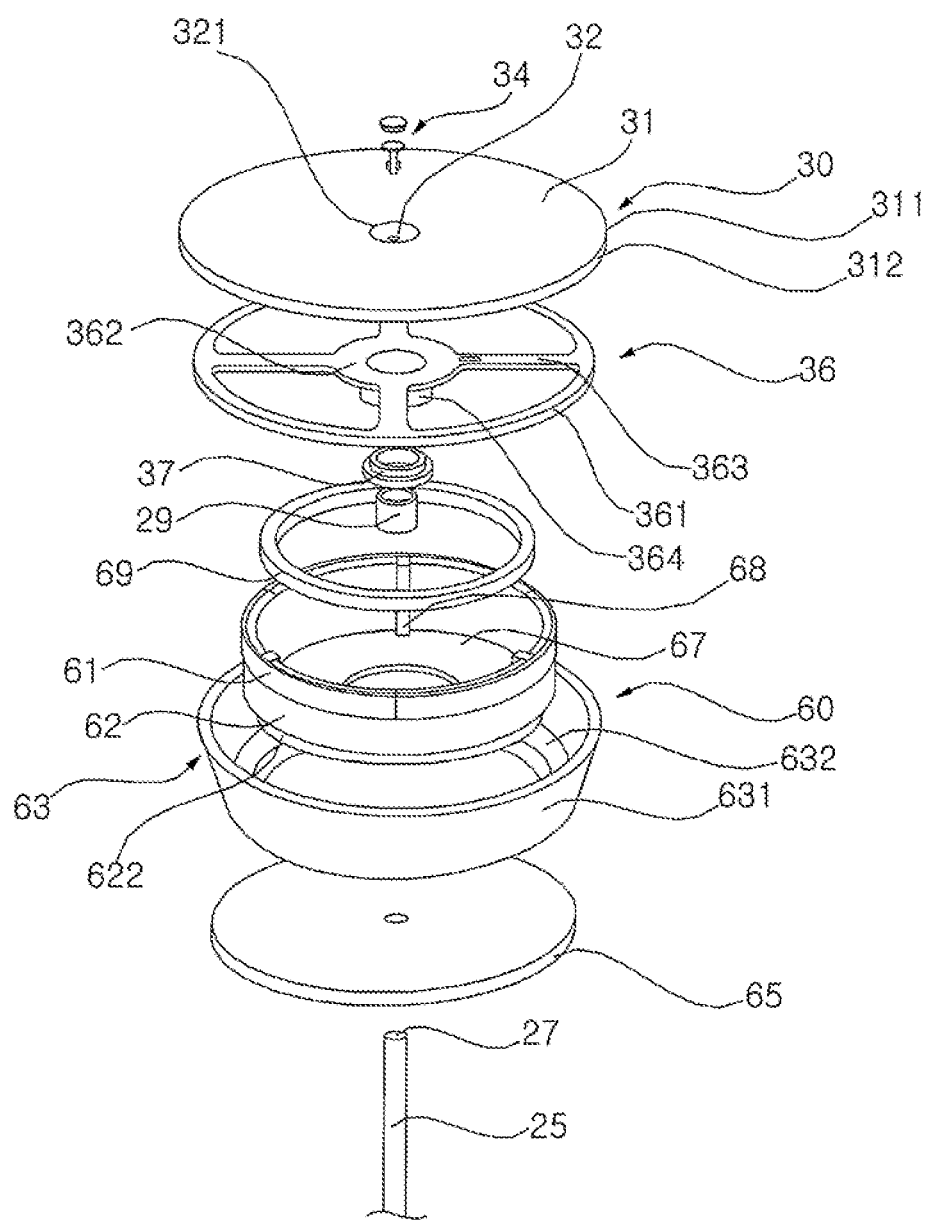
FIG. 6 is an exploded perspective view of the illumination assembly shown in FIG. 5.

Referring to FIGS. 2 and 6, the water supply pipe 25 may extend in the vertical direction of the water tank 10. The water supply pipe 25 may include a water inlet 26 at a lower end and a water outlet 27 at an upper end. The water discharged from the pump 20 may flow into the water supply pipe 25 through the water inlet 26 and may be discharged through the water outlet 27.

Figure 4:
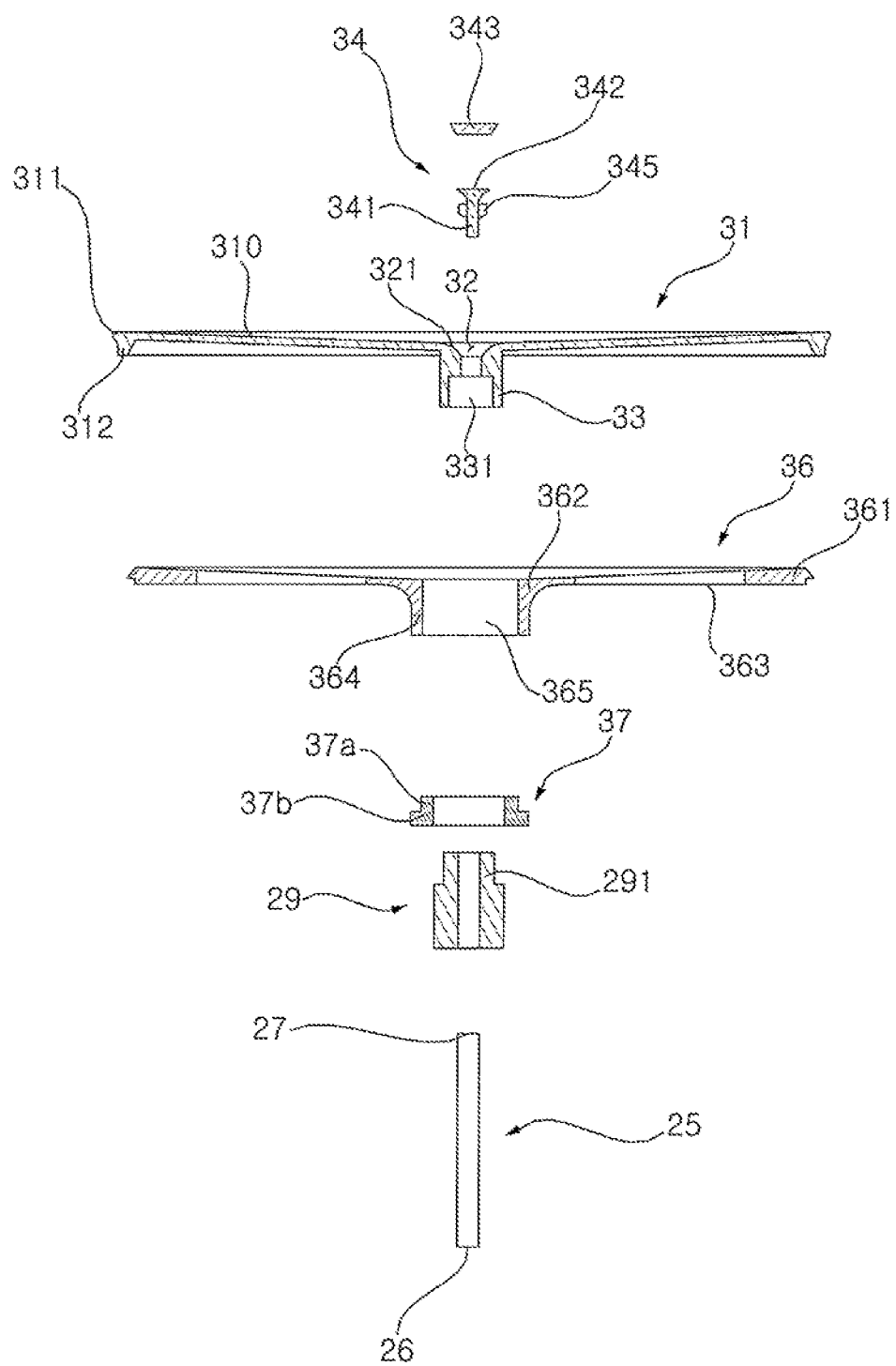
FIG. 4 is an exploded sectional view showing a water supply plate and a water supply pipe.

Referring to FIG. 4, the water supply plate 30 may include the plate body 31 formed with the water supply hole 32, which may communicate with the water outlet 27 of the water supply pipe 25. A nozzle stopper or plug 34 may be partially inserted into the water supply hole 32. A plate support or plate frame 36 may be provided below the plate body 31.

The plate body 31 may be provided above the water tank 10. Although the plate body 31 may be formed in the form of a disk, it may be formed in a polygonal shape or various other shapes. The upper surface 310 of the plate body 31 may be inclined upward toward an edge 311 of the plate body 31. A first boss 33 may protrude downward from a lower side of the plate body 31. The water supply hole 32 may be formed to extend through the first boss 33. A trumpet-shaped portion or upper portion 321 of the water supply hole 32 may be formed such that a diameter of the upper portion 321 gradually increases from a lower portion of the water supply hole 32 toward the upper surface 310. The water supply hole 32 is formed in the center of the water supply plate 31 in the embodiment of the present invention. The center means the center of the circle when the plate body 31 is a circular plate, and the center of gravity when it is a regular polygon. However, it may be formed in various other positions.

The upper surface 310 of the plate body 31 may have a constant or straight inclination or slope from the water supply hole 32 toward the edge 311. The edge 311 may be somewhat rounded or curved to encourage water to flow downward over the edge 311. At least a portion of the edge 311 may be oriented to be perpendicular to a direction of gravity.

The constant inclination of the upper surface 310 may form a predetermined angle with a horizontal plane. The predetermined angle may be an acute angle. As an example, the predetermined angle may be greater than 0 degrees and less than 45 degrees so that water supplied to the plate body 31 flows collectively or quickly toward the edge 311. The upper portion of the water supply hole 32, along with the upper surface 310 of the plate body 31, may be gradually inclined upward so that the water supplied through the water supply hole 32 may be supplied with a driving force or speed with a greater horizontal component than a vertical component.

As exemplified in FIG. 4, the upper surface 310 of the plate body 31 may have an inclination angle of about 2 degrees. The water flowing along the upper surface 310 of the plate body 31 may maintain a constant thrust and momentum in the horizontal direction toward the edge 311. The water flowing over the plate body 31 may not drip down on a support 63 of the illumination assembly 60 provided below the plate body 31 and may instead form a water film or wall and fall off the edge 311 downward directly to the water guide 50. The support 63 may serve as a light diffuser, and may also be referred to as a light guide or a light guide plate. Accordingly, the pet water dispenser may supply a large area of falling water to the pet.

The illuminating assembly 60 may be provided inside the water wall formed by the water falling from the plate body 31 and may irradiate light toward the falling water. The light irradiated from the illumination assembly 60 may be refracted and reflected by the falling water, so that the pet water dispenser may be beautiful.

Figure 5:
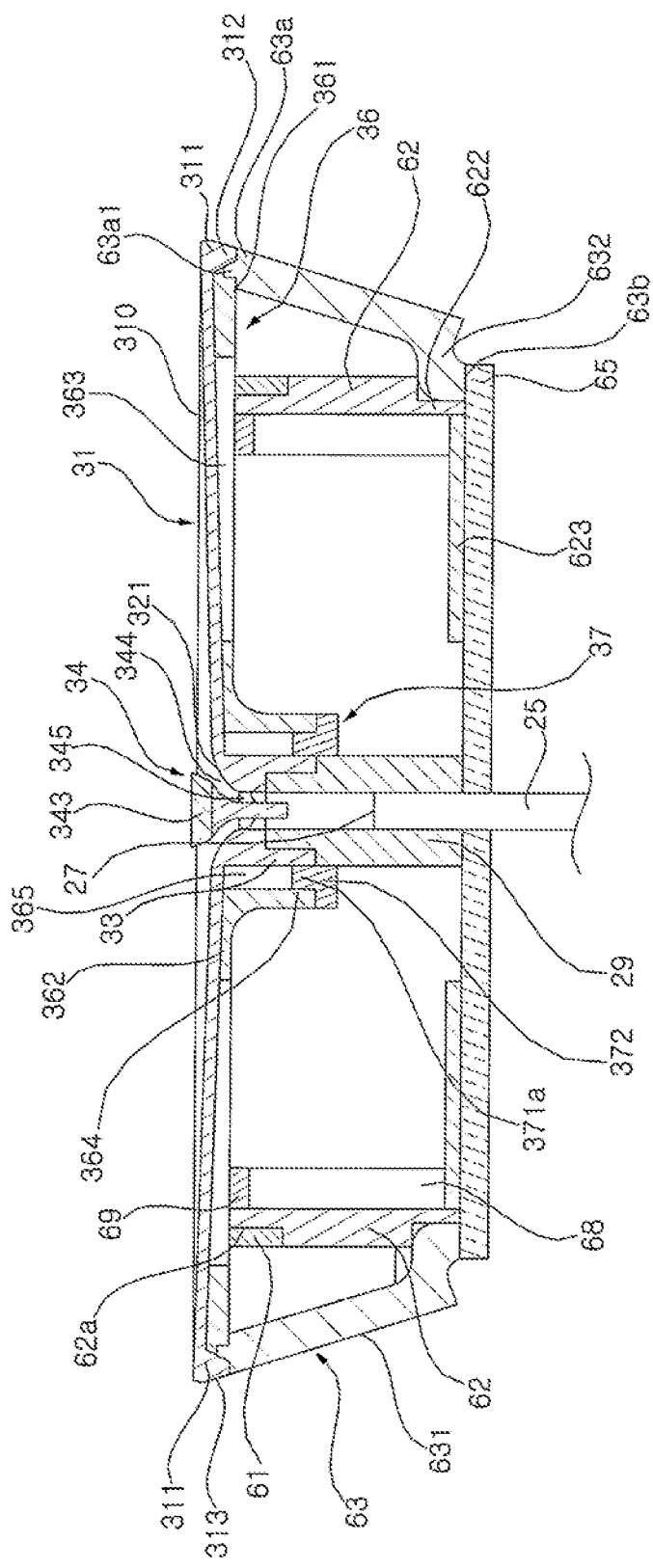
FIG. 5 is a cross-sectional view of an illumination assembly shown in FIG. 4.

Referring to FIG. 5, an outer surface 313 of the plate body 31 may be inclined inward toward the center of the water tank 10 from the edge 311 toward a lower side. An outer surface 631 of the support 63, which will be described later, may be positioned below the outer surface 313 of the plate body 31. The outer surface 313 of the plate body 31 and the outer surface 631 of the light diffuser 63 may have a same or similar inclination to create a seamless appearance.

The water leaving the edge 311 of the plate body 31 may not flow along the outer surface 631 of the support 63 but may instead drop directly from the edge 311. The plate body 31 may be formed of a plate having a constant thickness and may also include an edge protrusion or extension 312 protruding downward from the edge 311. An outer surface of the edge protrusion 312 may form the outer surface 313 of the plate body 31. Accordingly, the outer surface of the edge protrusion 312 may be inclined inward from the edge 311. The outer surface 631 of the support 63 may be positioned below the edge protrusion 312.

The edge protrusion 312 may be provided on an upper end 63a of the support 63. An inner circumferential surface of the edge protrusion 312 may be in contact with an outer circumferential surface of the plate support 36 and also with a projection 63a1 of the support 63 extending upward from the upper end 63a. The plate support 36 and the plate body 31 may be stably supported.

The plate body 31 may be made of metal (e.g., stainless steel) and may be formed to have a thin thickness. When the plate body 31 is made of stainless steel, corrosion may be prevented, and a luxurious appearance may be formed. The plate body 31 may alternatively be made of plastic and coated with metal.

The pet water dispenser may include the illumination assembly 60 installed or located below the plate body 31. The plate body 31 may be made of a transparent or semi-transparent material that diffuses or transmits light. Light from the illumination assembly 60 below the plate body 31 may be diffused and irradiated upward through the plate body 31, and the pet water dispenser may also function as a lamp or lighting device. Further, the plate body 31 may be integrally formed with the support 63 so that the water falling from the plate body 31 may not flow into an inner space of the illumination assembly 60 where light emitting devices (LEDs) or organic light emitting devices (OLEDs) are installed.

As an alternative, the plate body 31 may be configured to be removable from the support 63. The water supply plate 30 may be configured to be removable from the illumination assembly 60. The water supply plate 30 may be lifted up and removed to be cleaned, repaired, or swapped with another water supply plate 30 having a different height, shape, angle of inclination, material, etc.

Referring back to FIG. 4, the diameter of an upper end or head 342 of the plug 34 may be larger than a diameter of the water supply hole 32. The head 342 may be provided higher than the edge 311 of the plate body 31. The head 342 may be formed with a head cover 343 extending upward.

A stem 341 of the plug 34 may be at least partially inserted into the water supply hole 32. The stem 341 may have a smaller diameter than the head 342 and the water supply hole 32. A plurality of circumferentially spaced retaining pieces or ribs 345 projecting outward from the stem 341 may prevent the stem 341 from being fully inserted into the water supply hole 32. Alternatively, the plug 34 may be a float which moves up and down based on water flowing out of the water outlet 27 of the water supply pipe 25, and the float may completely close the water supply hole 32 when the pump 20 is turned off. The ribs 345 may be captured within the water supply hole 32. The water supply hole 32 may include grooves to allow the ribs 345 to move up and down based on water being pumped when the plug 34 serves as a float.

The plug or float 34 may serve as a diverter. The stem 341 of the plug 34 may be inserted into the water supply hole 32 such that the head 342 and the head cover 343 are spaced upward from the water supply hole 32. A water outlet or port 344 may be formed between the head cover 343 and/or head 342 of the plug 34 and a portion of the plate body 31 that forms the upper portion 321 of the water supply hole 32. The water outlet 344 may be ring-shaped with the plug 34 at a center. The plurality of ribs 345 may contact a portion of the plate body 31 that forms the water supply hole 32 to support the plug 34 in a predetermined position in the water supply hole 32.

The plate support 36 may support the plate body 31. The plate body 31 may be detachably seated on the plate support 36. In addition, a sealing ring 37 may connect the plate body 31 and the plate support 36. The sealing ring 37 may be made of an elastic (e.g., rubber) and may also be referred to as a packing ring.

The plate support 36 may include an outer ring 361 abutting against a bottom surface of the plate body 31 and the edge projection 312 and a hub or inner ring 362 located at a center of the plate support 36. A plurality of spokes 363 (see also FIG. 6) may extend between the outer and hub rings 361 and 362. A second boss 364 may protrude downward from the hub ring 362.

The first boss 33 may be inserted into a hole 365 formed in the hub ring 362 and in the second boss 364. The sealing ring 37 may be inserted between the second boss 364 and the first boss 33.

A light support or base 62 and the support 63 may be provided below the plate support 36 to support the plate support 36. Details of the support 63 and light base 62 will be described later with reference to FIGS. 5-7.

The sealing ring 37 may be formed of an elastic body or member (e.g., of a rubber material). The sealing ring 37 may be at least partially press-fitted between the first boss 33 and the second boss 364 to couple the plate body 31 and the plate support 36 together. An upper portion 37a of the sealing ring 37 may be press-fitted into the hole 365 of the second boss 364 to be press-fitted between the first and second bosses 33 and 364. The first boss 33 may be at least partially press-fitted into a hole formed in the sealing ring 37 and inserted into the second boss 364. The first boss 33 and the second boss 364 may be coupled by an elastic force of the sealing ring 37.

The sealing ring 37 may have a lower portion 37b having an outer diameter larger than an outer diameter of the upper portion 37a. An inner diameter of the upper portion 37a may be equal to an inner diameter of the upper portion 37b. The lower portion 37b may support a bottom surface of the second boss 365 and may support the plate support 36.

The water supply hole 32 formed in the first boss 33 and the plate body 31 may be formed with a hole 331 extending downward. A water outflow member or coupler 29 may be inserted into the hole 331.

Referring to FIGS. 4 to 6, the coupler 29 may provide a passage or hole to connect the water supply pipe 25 and the plate body 31. The water supply pipe 25 may be at least partially inserted into the water outflow member and arranged such that the water outlet 27 communicates with the water supply hole 32.

The coupler 29 may be formed in a cylindrical shape having a length in the vertical direction. The passage or hole of the coupler 29 may communicate with a lower portion of the water supply hole 32. The lower portion of the water supply hole 32 may have a smaller diameter than the upper portion 321 of the water supply hole 32.

The water supply pipe 25 may penetrate a partition plate 65 and may be inserted into a lower side of the passage communicating with the water supply hole 32 formed in the coupler 29. An upper portion 291 of the coupler 29 may be inserted into the hole 331 formed in the first boss 33 of the plate body 31.

A UV (Ultraviolet) filter or light may be provided in the passage formed in the coupler 29 to sterilize water that passes through the water supply pipe 25 or is discharged from the water outlet 27. The UV filter may include a UV LED (Ultraviolet Light Emitting Diode) and a diffusion plate. The coupler 29 may be referred to as a UV filter or light or a third UV filter or light. The coupler 29 may be installed to cover the water outlet 27, and the passage of the coupler 29 may extend higher than the water outlet 27. The UV filter may directly sterilize water discharged from the outlet 27 by irradiating ultraviolet rays.

Referring to FIGS. 2 and 5-7, the illumination assembly 60 may irradiate light toward an outside, thereby alleviating seasonal depression or SAD of the pet. The illumination assembly 60 may illuminate the water falling from the water supply plate 30 or the plate body 31, and may attract a pet to drink water.

The illumination assembly 60 may be installed between the water tank 10 and the plate body 31, and may be arranged below the plate body 31 and inside the water wall formed from the water supply plate 30. The support 63, which may form an outer surface or side of the illumination assembly 60, may have a diameter smaller than a diameter of the water supply plate 30. The illumination assembly 60 may illuminate the water falling from the plate body 31 from an inside of the water wall, and the light emitted from the illumination assembly 60 may be refracted and reflected by the falling water. Furthermore, the illumination assembly 60 may be provided below the water supply plate 30 to be within the water wall to prevent the glare.

When the illumination assembly 60 is installed at a lower portion of the pet water dispenser, the amount of light irradiated to the pet may be insufficient to alleviate the seasonal depression or SAD of the pet. In addition, light to be irradiated may be insufficient to perform a function as a lighting device. The illumination assembly 60 is provided above the water tank 10. Thus, an appropriate amount of light may be illuminated to the pet to perform light therapy and serve as a lamp while preventing the glare.

A partition plate 65 may partition the illumination assembly 60 and the water tank 10 to protect an inner space of the illumination assembly 60 from water. The illumination assembly 60 may include a light emitter or light device 61 to emit light to an outside of the pet water dispenser, a light support or base 62 on which the light device 61 may be installed, and the support 63 provided on an outside of the light base 62. The light base 62 may also be referred to as a light mount.

Figure 7B:
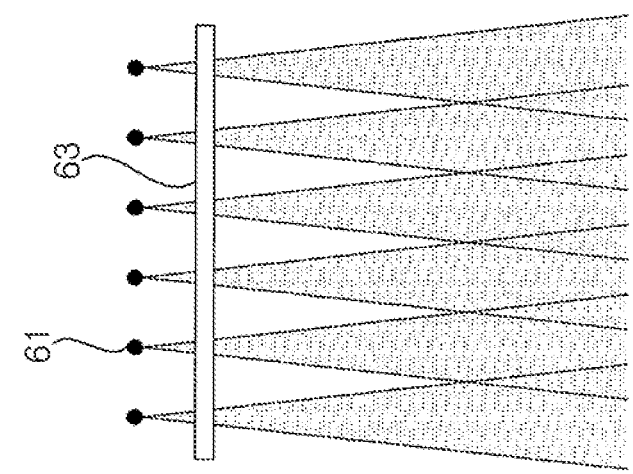
FIGS. 7A and 7B are conceptual views illustrating an irradiation of light emitted from a light emitting diode (LED) and an organic light emitting diode (OLED)
Figure 7A:
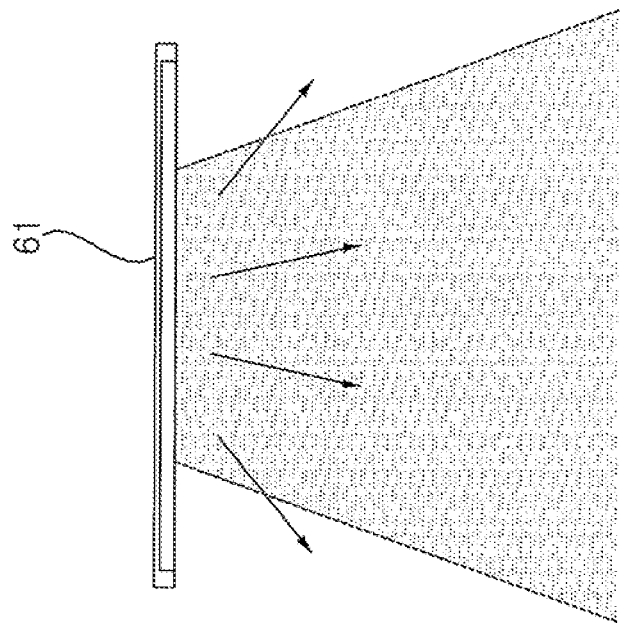

The light device 61 may be fabricated from at least one light emitting diode (LED) as shown in FIG. 7A. The light device 61 may be made of a plurality of light emitting diodes. The plurality of LEDs may be attached to the light base 62 to form an array of predetermined shapes. The light device 61 may be inserted and attached to an inwardly recessed portion or step portion 62a formed on an outer surface of an upper side of the light base 62.

Referring to FIG. 7A, each of the plurality of light emitting diodes (LEDs) may form a point light source, and the light emitted from the light emitting diodes (LEDs) may have a strong focus of light within a narrow area. The light device 61 extend around the outer surface of the light base 62, and the light may be irradiated to an outside through the support 63 in a relatively uniform manner.

As shown in FIG. 7B, the light device 61 may additionally or alternatively include at least one organic light emitting diode (OLED). The organic light emitting diode OLED may be fabricated to form a planar surface. The organic light emitting diode (OLED) may form a planar light source and may uniformly irradiate light over a wide area. Therefore, it is possible to reduce glare.

The organic light emitting diode (OLED) may be thin and warped or curved. The light device 61 may be made of a ring-shaped organic light emitting diode (OLED). There may be a plurality of arc-shaped or band-shaped light devices 61 provided adjacent to each other to form a single ring-shaped light device 61 on the light base. For example, a ring-shaped organic light device 61 may be formed by connecting three arc-shaped organic light emitting diodes (OLEDs) having a radius of curvature of 120 degrees.

Light emitted from the organic light emitting diode (OLED), and has a spectrum of light most similar to natural light than other lighting apparatuses currently developed. Accordingly, when the light device 61 is made of an organic light emitting diode (OLED), it is possible to alleviate seasonal depression.

The organic light emitting diode (OLED) may generate less blue light (i.e., light of low wavelength between 380 nm and 500 nm having the most energy among visible rays). Blue light is effective in increasing concentration and arousal, but it disturbs the secretion of the melatonin hormone, causing sleep disorders. In addition, blue light causes dry eye syndrome and macular degeneration. The light body 61 may be fabricated as an organic light emitting diode (OLED), thereby mitigating seasonal depression and preventing disadvantages such as sleep disorder.

In addition, the organic light emitting diode (OLED) generates less heat due to lighting than other light emitting diodes. Accordingly, the light device 61 may be made of an organic light emitting diode (OLED), and a maintenance of the temperature of the water by the water temperature regulator (the thermoelectric element 81, the heat sink 84, the fan 83, and the motor 82) may consume less power.

Referring back to FIGS. 5-6, the light base 62 may be provided inside the support 63 and extend between the plate body 31 and the water guide 50. A recess or step portion 622 may be formed inwardly at the outer surface at a lower side of the light base 62. The lower end 63*b* of the support 63 may be protrude inward to insert into the recess 622 of the light base. The support 63 and the light base 62 may then together be placed on the partition plate 65.

The light base 62 may include a reinforcing rib 68 and a reinforcing ring 69 provided on an inner surface. The reinforcing ring 69 may be provided below the plate support 36 to support the plate support 36. The reinforcing ribs 68 may be provided below the reinforcing rings 39 to support the reinforcing rings 69.

A circuit board 67 on which a processor to control a light emission of the light device 61 may be provided on the partition plate 65 and extend from the outer surface at the lower side of the light base 62. The circuit board 67 may be a printed circuit board (PCB). The circuit board 67 may be connected to the controller C described later.

The reinforcing ribs 68 may form a housing to accommodate electric wires in an inner space between an outer surface of the light support 62 and an outer surface of the reinforcing ribs 68. For example, an electric wire connecting the circuit board 67 and the light device 61 may be housed in the space between the reinforcing ribs 68 and the light base 62. The reinforcing ring 69 may be provided as a housing holder so as to support the light base 62 while fixing the reinforcing rib 68 to the light base 62. The light emitter support 62, the support 63, and the partition plate 65 may be welded, bonded or fused together, or they may be assembled to be detachable from each other.

The support 63 may form an outer edge of the illumination assembly 60. The support 63 may be formed in a trumpet or truncated cone shape having a diameter that increases from the lower end 63*b* to the upper end 63*a*. The support 63 may extend between the plate body 31 and the water guide 50 described later. The support 63 may be placed on an inner guide wall 53 of the water guide 50 and the partition plate 65 to be stably supported above the water tank 10.

The upper end 63*a* of the support 63 may be in contact with the edge protrusion 312 of the plate body 31 and the outer ring 361 of the plate support 36. The lower end 63*b* of the support 63 may be provided on the partition plate 65. Alternatively, the lower end 63*b* of the support 63 may be provided on an upper side of a 54 of the water guide 50 described later.

The outer surface 631 of the support 63 may form an inclined surface that is inclined gradually inward from the edge 311 of the plate body 31 toward the lower end 63*b* of the support 63. Based on the flow of water pumped by the pump 20, water dropped from the edge 311 of the plate body 31 may fall vertically without flowing along the support 63. The dropping of water creates a waterfall to simulate running water, which is pleasing for animals.

The upper end 63*a* of the support 63 may be formed in a shape corresponding a shape of the lower surface of the edge 311 of the plate body 31. The upper end 63*a* of the support 63 may include an upward projection or extension 63*a*1 protruded upward. The projection 63*a*1 may protrude upward at a position spaced inwardly from an upper end of the outer surface 631 by a distance equal to a width of a lower end of the edge protrusion 312. A length of the projection 63*a*1 and a length of the edge protrusion 312 may be the same. The outer surface of the projection 63*a*1 may contact an inner surface of the edge protrusion 312, and the lower end of the edge protrusion 312 may be provided on the upper end 63*a* of the light diffuser to be adjacent to the projection 63*a*1. Water may not seep into the illumination assembly 60, and an inner space of the illumination assembly 60 may be sealed.

The support 63 may have an inwardly projecting portion or inward protrusion 632 protruding inward from the lower end 63*b*. An inner end of the inward protrusion 632 may protrude downward to be in contact with the partition plate 65. A portion of the support 63 protruding downward and/or outward from the inward protrusion 632 may be inserted into and engaged with a groove 541 formed in an upper side of the guide 54 of the water guide 50. An upper portion of the illumination assembly 60 may be coupled to the plate body 31 while a lower portion thereof is coupled to the partition plate 65 to form a space that is sealed inside.

The partition plate 65 may be supported by the water guide 50 and may support the illumination assembly 60 and the coupler 29. The partition plate 65 may be placed on the guide 54 of the water guide 50.

Figure 8:
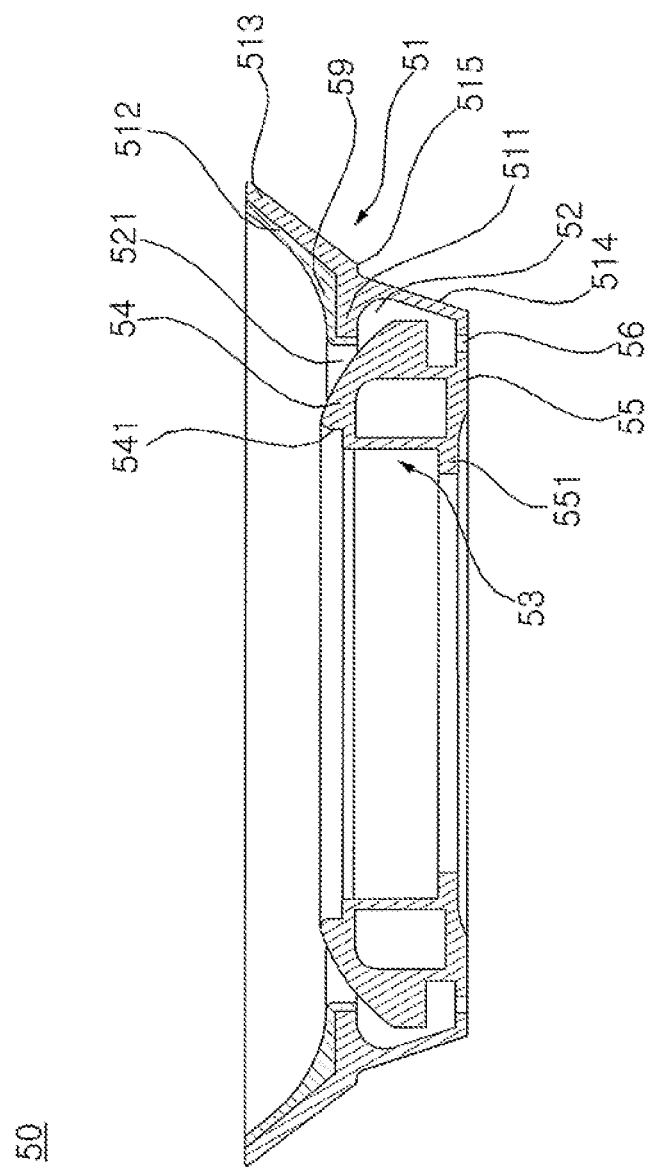
FIG. 8 is a cross-sectional view of a water guide.

Referring to FIGS. 2 and 8, the water guide 50 may receive the water falling from the water supplying plate 30 and guide the water to the water tank 10. The water guide 50 may be arranged to be below and spaced apart from the plate body 31, and the illumination device 60 may be provided between the water guide 50 and the water supply plate 30.

The water guide 50 may include an outer guide wall 51 forming an outer rim and an inner guide wall 53 forming an inner rim. A drain passage 521 may be formed between the outer and inner guide walls 51 and 53. A bottom wall 55 may extend between lower ends of the outer and inner guide walls 51 and 53 and may include a discharge hole 56 communicating with the drain passage 521 to guide water dropped from the plate body 31 and flowing down the drain passage 521 into the water tank 10. The discharge holes 56 may be formed in one or more ring-shaped holes or circular holes formed along a circumferential direction of the bottom wall 55.

The inner guide wall 53 may be formed with a guide 54 protruding toward the outer guide wall 51 and inclined downward. The water dropped from the plate body 31 may be guided downward along the guide 54. The guide 54 may be formed such that an upper surface thereof is rounded.

An upper side of the guide 54 may support a lower side of the support 63. A groove 541 may be formed on the upper side of the guide 54 so that an edge of the partition plate 65 may be positioned in the groove 541, and the support 63 may be provided between the upper side of the guide 54 and the partition plate 65.

An upper or inner portion of the guide 54 adjacent to the groove 541 may be formed to have a smaller diameter than a diameter the plate body 31, and a lower or outer portion of the guide 54 may have a larger diameter than the diameter of the plate body 31 when viewed from above. The water dropped from the plate body 31 may be guided by the guide 54 to the water tank 10.

The support 63, the water guide 50, and the partition plate 65 may be assembled to be detachable from each other by a known method, or may be fixedly connected to each other by a method such as adhesion, welding, or fusion. When the water guide 50 is assembled to be detachable from the support 63, the water guide 50 may be replaced with another water guide having a different shape or height.

The outer guide wall 51 of the water guide 50 may have a protrusion 511 on an inner side thereof protruding toward the guide 54. An inner surface 512 of the outer guide wall 51 may extend upward from the protrusion 511 to be an inclined surface. The drain passage 521 may be narrower between the protrusion 511 and the guide 54. The water dropped from the plate body 31 to the water guide 50 may stay on the guide 54 and the protrusion 511 for a while and then flow downward through the narrower portion drain passage 521. The protrusion 511 may serve as an additional filter to block large foreign substances from continuing down the drain passage 521.

A reflection plate 59 formed of a material having a high reflectivity may be provided on the inner surface 512 and an upper surface of the protrusion 511. The reflection plate 59 may be made of a metal having high reflectance such as stainless steel or coated plastic. The light irradiated from the illumination assembly 60 may be reflected by the reflection plate 59 to irradiate light at various angles.

The reflection plate 59 may be formed to incline gradually outward from a lower side to an upper side along with an inclination of the inclined surface 513. The water falling from the plate body 31 may not scatter or splash outside of the water guide 50. Furthermore, the outer guide wall 51 may be formed to be larger than the inner guide wall 53 and the upper wall 11a of the water tank 10. A predetermined angle Θ1 may be formed between the upper wall 11a and the outer guide wall 51. The predetermined angle Θ1 may be, for example, 120 degrees.

The outer guide wall 51 of the water guide 50 may be positioned lower than the plate body 31 so that the pet may easily drink water. The outer guide wall 51 of the water guide 50 may be located lower than the upper end 63a of the support 63 so that the light emitted by the light device 61 may be easily seen from an outside through the support 63.

An outer surface of the outer guide wall 51 may be formed with the upper and lower inclined surfaces 513 and 514. A step portion 515 may be formed between the upper and lower inclined surfaces 513 and 514. The lower inclined surface 514 may be supported on the inner tank wall 113 of the water tank 10. The step portion 515 of may be placed on a corner of the first protruding plate 111 formed on the upper wall 11a. The upper inclined surface 513 of may be held in contact with the bumper 115 attached on the upper wall 11a. The water guide 50 may be firmly provided above the water tank 10.

The support 63 and the partition plate 65 may be held in contact with the water guide 50. The light base 62 may be provided on the partition plate 65. The plate body 31 may be provided on the support 63 and the light base 62. As a result, the plate body 31 may be firmly supported above the water tank 10 so that water may fall into the water tank 10.

The bottom wall 55 of the water guide 50 may have an extension or protruding jaw 551 protruding inward from the inner guide wall 53. The extension 551 551 may be positioned above an edge of the upper filter cover 46.

Referring back to FIG. 2, a sealed space or chamber S, which is sealed from the container storing water of the water tank 10, may be formed between the upper filter cover 46, the inner guide wall 53, and the partition plate 65. An auxiliary battery B and the controller C may be installed in the space S. The auxiliary battery B may be charged via external power applied to a docking station and transmitted to the auxiliary batter B in the space S via a wireless power transfer (WPT) method including wireless power receivers and transmitters and/or transceivers. Details of a WPT method are described in related U.S. application Ser. No. 16/571,075 filed on Sep. 14, 2019, the entire contents of which are incorporated by reference herein. The extension 551 and the upper filter cover 46 of the water guide 50 may be assembled to be detachable from each other by a known means such as an arm, a hook or a screw, or may be fixedly coupled by fusion or adhesion.

Figure 9:
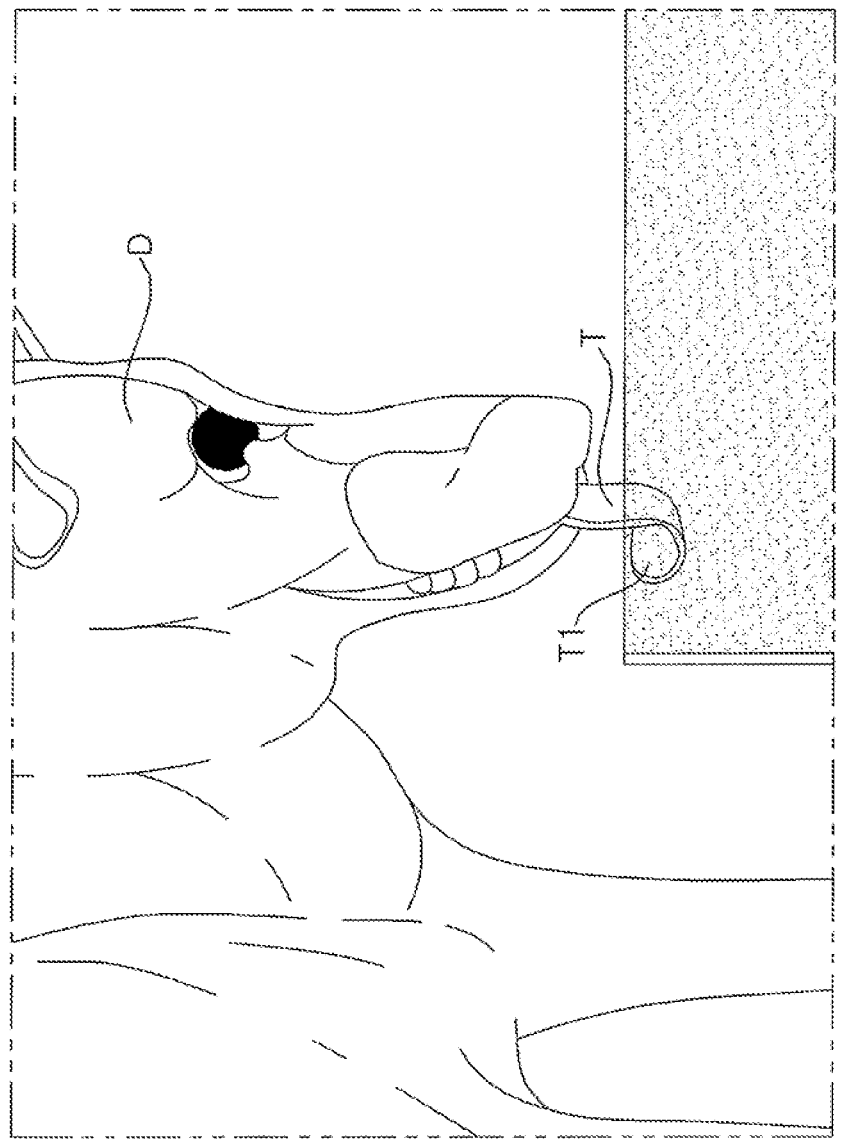
FIG. 9 is a conceptual diagram showing a state in which a pet drinks water.

Referring to FIG. 9, when an animal, e.g., a dog D is drinking water, its tongue T may be curled backward to form a space T1 on a rear of the tongue T. Water may be filled in and stored in the space T1, and the dog D may continue to keep its tongue T curled while lifting its tongue T to its mouth to pour out the stored water and drink the water kept in the space T1. A pet water dispenser dispensing water over a shallow surface and forcing a pet to use a front surface of its tongue may not be suitable for dogs. When a water supply plate is inclined downward, a depth of the water flowing along the plate is shallow, which makes it difficult to drink water using a rear space T1 of the tongue T.

The pet water dispenser according to an embodiment is provided with the pump 20 inside the water tank 10 to supply water to the plate body 31 provided at a higher position than the water tank 10 through the water supply pipe 25. The plate body 31 may be formed to be inclined upward from the water supply hole 32 toward the edge 311. The water supplied to the water supply plate 31 drops from the edge 311 of the water supply plate 31. The water may flow over the plate body 31, which may temporarily store water because water may pool in a center of the plate body 31 due to an upward inclination of the plate body 31. Water pooled in the center of the plate body 31 may be consumed, along with water falling off the plate body 31. Further, since water falls or cascades from the plate body 31 as a water wall or rim having a flat surface, a large number of pets may drink water at the same time without any crowding or other inconveniences.

Furthermore, the pet water dispenser according to an embodiment may include OLEDs to treat SAD or seasonal depression during rainy or cold seasons. When the pet water dispenser is operated, the light device 61 may be turned on and water may drop from the plate body 31 toward the water tank 10. The support 63 may be formed to be smaller than the plate body 31 when seen from above, so that light emitted by the light device 61 may be seen through or between the falling water.

The light device 61 may include an organic light emitting diode (OLED) as described above to alleviate seasonal depression of the pet. Further, the device 61 may be formed to have a small thickness, and may be formed in a belt-like or arc-like shape along the light base 62.

Figure 10:
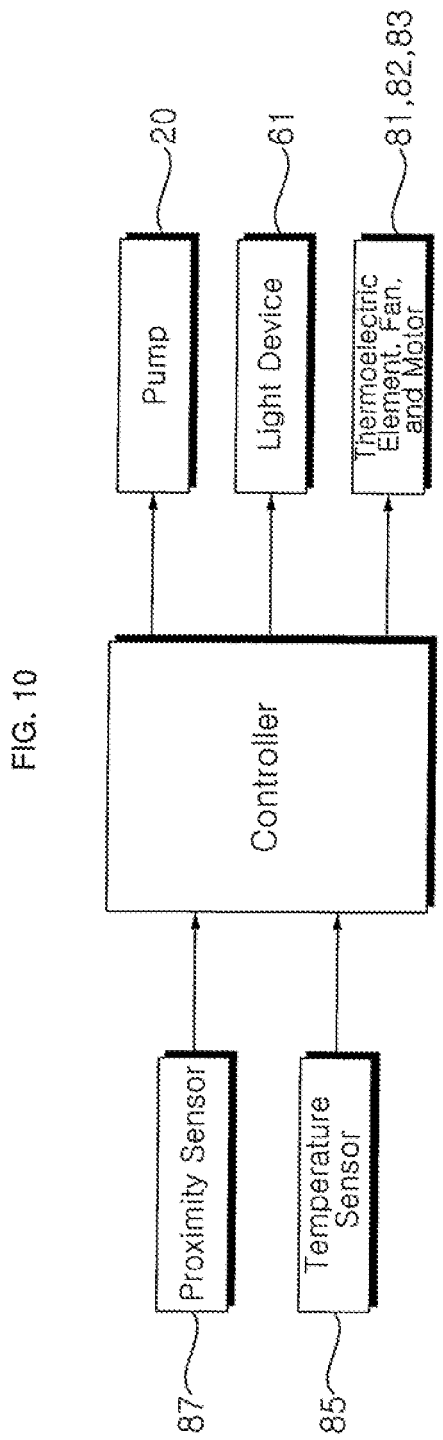
FIG. 10 is a block diagram showing an operation of a controller.

Referring to FIG. 10, a control module or controller C to control an operation of the pump 20, the light device 61, and at least one sensor (e.g., proximity sensor 87) may be provided. There may be a plurality of proximity sensors 87 spaced apart from each other along a periphery of the pet water dispenser to detect when a pet is present within a predetermined distance range, and also to continually sense a position of the pet to detect whether the pet is approaching the pet water dispenser.

The controller C may receive a signal from the proximity sensor 87 to determine whether the pet is approaching the pet water dispenser within the predetermined distance range. When the controller C determines that the pet is present (or alternatively is approaching) within the predetermined distance range, the controller 20 may operate the pump 20. The controller C may stop the operation of the pump 20 when it is determined that the pet is not present (or alternatively is not approaching) within the predetermined distance range. It is possible to control the pump 20 to be operated only when the pet continues to approach by a certain increment within the predetermined distance.

The controller C may turn on the light device 61 and operate the pump 20 when at least one of the plurality of proximity sensors 87 senses a pet. The controller C may turn off the light device 61 if the plurality of proximity sensors 87 does not sense a pet for more than a predetermined time period during an operation of the light device 61. The controller C may also stop the operation of the pump 20 when the plurality of proximity sensors 87 does not sense the pet for more than the predetermined time period during an operation of the pump 20.

The controller C may control the light device 61 to be turned off when the pump 20 is turned off after operating. Alternatively, even when the pump 20 is not operating, the light device 61 may be turned on by the controller C so as to serve as a lighting device or lamp.

When the controller C determines that a plurality of pets have approached the pet water sensor based on signals received from the plurality of proximity sensors 87, the controller C may increase the pumping capacity or rate of the pump 20 so as to correspond to the number of approaching pets. A sufficient amount of water may be supplied to the pets. The controller C may also control the thermoelectric element 81, motor 82, and fan 83 (collectively referred to as the temperature regulator) to regulate the temperature of the water of stored in the water tank 10.

This application is related to U.S. application Ser. No. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,089 filed on Sep. 14, 2019, U.S. application Ser. No. 16/571,076 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/570,279 filed on Sep. 13, 2019, U.S. application Ser. No. 16/659,841, filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919, and 10-2019-0060920 filed on May 24, 2019; and 10-2019-0080603 and 10-2019-0080604 filed on Jul. 4, 2019.

Embodiments disclosed herein may be implemented as a liquid dispenser that supplies drinking water to an animal such as a pet. However, embodiments disclosed herein are not limited to pets. For example, the liquid dispenser may be used in a zoo to supply drinking water to animals kept in a zoo, research areas, wildlife preservation areas, etc.

Embodiments disclosed herein may be implemented as a water dispenser or pet water dispenser which may arouse curiosity and interest in a pet to induce the pet to drink water flowing from the water dispenser. The water dispenser may alleviate seasonal depression or seasonal affective disorder (SAD) of pets due to a lack of going out or a lack of sunshine. The water dispenser may provide a lighting device or an illumination assembly that reduces glare and protects the eyes of the pets. The water dispenser may be beautiful in appearance and can function as a lighting device or lamp to improve the dignity or mood of the indoor space.

The water dispenser may prevent or reduce the risk of insomnia from being caused by an illumination assembly or device. The water dispenser may easily keep a water temperature from rising due to a configuration of the illumination assembly. The water dispenser may stably support a water supply plate even if the water supply plate to which water is supplied is provided above the water tank.

The problems solved by the present disclosure are not limited to the above-mentioned problems, and other problems not mentioned can be clearly understood by those skilled in the art from the following description.

A pet water dispenser according to an embodiment may include a water tank to store water and a lighting device or illumination assembly to irradiate light toward an outside. The illumination assembly may include at least one light emitter (or light emitting body) or a light device to emit light to the outside of the pet water dispenser. The light device may include an organic light emitting diode (OLED). The light device may be formed in a ring shape. The light device may be formed in a ring shape having a virtual line perpendicular to a ground as a central axis.

A pump may feed water stored in the water tank. The pump may be installed inside the water tank. A control module or a controller may control an operation of the pump and a lighting of the device. The controller may control the operation of the pump and the lighting of the light device in conjunction with each other. The controller may control the operation of the pump and the lighting of the light device so that light illuminates when the pump is operated and the light device is turned off when the pump stops operating.

The pet water dispenser may include at least one proximity sensor to sense a pet within a predetermined distance range. A plurality of proximity sensors may be provided. The plurality of proximity sensors may be spaced apart from each other along a periphery of the pet water dispenser.

The controller may turn on the light device when the proximity sensor senses the pet. The controller may turn on the light device when at least one of the plurality of proximity sensors senses the pet. The controller may turn off the light device if the plurality of proximity sensors do not sense the pet for more than a set or predetermined time during a lighting of the light device.

A water supply pipe may be connected to the pump and a water supply unit or plate. The water supply pipe may be connected to the pump so that water can be transferred. The water supply unit may include a water supply plate or a plate body. The water supply plate may have a water supply hole communicating with the water supply pipe. The water supply plate can supply water from the water supply pipe through the water supply hole.

The water supply unit may be provided higher than the water tank. The water supply plate may be spaced upward from the water tank. The water tank may be provided below the water supply unit. The water tank may be opened at an upper side. The water supplied to the water supply unit can drop from the water supply unit. The water tank may store water failing from the water supply unit.

The water supply plate may have an upper surface through or over which water supplied through the water supply hole flows. The water supplied to the water supply plate can flow toward the edge of the upper surface and drop from the edge of the upper surface. The water reaching the edge of the upper side can fall downward from the edge toward the water tank.

At least some of the edges of the upper side may be located on the same plane perpendicular to a gravitational or vertical direction. The edges of the upper surface may be positioned on the same plane perpendicular to the gravity direction. The water falling from the edge can form a water film or water fall.

The illumination assembly may be installed below the water supply unit. The illumination assembly may be installed above the water tank. The illumination assembly may be installed between the water tank and the water supply unit. The illumination assembly can illuminate water falling from the water supply unit.

The illumination assembly may be installed below the water supply plate. The illumination assembly may be provided inside the water supply plate when viewed from above the water supply plate. The illumination assembly can illuminate water falling from the water supply plate.

The illumination assembly may include a light guide plate or a light diffuser to diffuse light emitted from the light device. The light guide plate may form an appearance of the illumination assembly. An upper end of the light guide plate may be provided in contact with an edge of the water supply plate. The upper end of the light guide plate and a lower side of the edge of the water supply plate may be formed to correspond to each other. An upper side of the light guide plate and a lower side of the edge of the water supply plate may be arranged to be in contact with each other. The light guide plate may be inclined so as to be gradually inclined inward toward a lower side.

The water supply plate may include an edge protrusion protruding downward from an edge of the water supply plate. The light guide plate may include an upward protruding portion, extension, or projection protruding upward at a position spaced inward from an upper outer circumference of the light guide plate. The inner surface of the edge protrusion and the outer surface of the upward protruding portion can contact each other. The edge protrusion may be inclined so that an outer surface gradually inclines inward toward a lower side.

A partition plate may partition the water tank and the illumination assembly. The partition plate can be coupled to a lower side of illumination assembly. The illumination assembly may include a light support on which the light device is installed. The light support may be provided inside the light guide plate. The light support can be placed on the partition plate. The light device may be installed on an outer surface of the light support.

A water guide or receiver may include a drain or drainage passage to discharge water falling from the water supply plate into the water tank. The water guide may include an outer guide wall formed to be inclined outward toward an upper side. The water guide may include an inner guide wall spaced inwardly from the outer wall. The drainage passage may be formed between the outer guide wall and the inner guide wall.

The water guide may be spaced apart from the water supply plate in the downward direction. The illumination assembly may be provided between the water supply plate and the water guide. The light guide plate may be provided between the water supply plate and the water guide. The outer wall may be placed in the water tank. The light guide plate may be placed on an inner side wall. The outer wall may be positioned lower than an upper end of the water supply plate and the light guide plate.

The illumination assembly may be installed between the water tank and the water supply unit, and water falling down from the water supply unit may be illuminated so that the pet can drink water while being curious and interested. The illumination assembly may include an organic light emitting diode (OLED), which is advantageous in relieving the seasonal depression of the pet due to lack of going out.

The illumination assembly may be installed below the water supply unit where the water is supplied, so that glare can be alleviated when the pet is drinking water. Further, the organic light emitting diode (OLED) can emit light having a spectrum similar to that of natural light. The light emitted by the organic light emitting diode (OLED) may emit less blue light having a shorter wavelength that is harmful to the eyeball. There is also an advantage in protecting the eyes of pets.

The illumination assembly may be provided lower than the water supply unit so that the glare of the pet is alleviated. At the same time, illumination assembly may be arranged higher than the water tank, and light can be irradiated to the pet to alleviate the seasonal depression. Further, the pet water dispenser can function as a lighting device or lamp.

Light irradiated by the organic light emitting diode (OLED) may have less blue light which interferes with melatonin production and obscures sleep. There is also an advantage that insomnia can be prevented or reduced from the illumination device. Heat generated by the organic light emitting diode (OLED) lighting can be minimized. Accordingly, there is also an advantage that the temperature of the water controlled by the pet can be prevented from rising due to the illumination assembly.

The illumination assembly may be provided on the lower side of the water supply plate, so that even if the water supply plate is arranged above the water tank, it can be stably supported. Further, there is an advantage that the water supply plate can be stably supported even if an external force is applied by providing the light guide plate of the illumination assembly in contact with a longest edge of the water supply plate.

Embodiments disclosed herein may be implemented as a liquid dispenser including a tank, a pump provided inside the tank to pump liquid, a pipe connected to the pump, a plate provided above the tank and having a hole communicating with the pipe to supply liquid from the pipe to the plate, and an illumination assembly provided between the tank and the plate. The illumination assembly may have a horizontal dimension smaller than a horizontal dimension of the plate and may include a light device to illuminate liquid failing from the plate. The plate may have an upper surface over which water supplied through the hole flows toward an edge of the plate, and the edge may be curved.

The illumination assembly may include at least one organic light emitting diode (OLED). The OLED may be formed in a ring shape.

A controller may control an operation of the pump and the illumination assembly. A light device of the illumination assembly may be turned on when a pump may be operated, and the light device may be turned off when an operation of the pump may be stopped. A plurality of proximity sensors may sense a position of a pet within a predetermined distance range. The plurality of proximity sensors may be installed apart from each other along a periphery of the liquid dispenser. The controller may turn on the light device when at least one of the plurality of proximity sensors senses a pet to be within the predetermined distance range. The controller may turn off the light device when the plurality of proximity sensors do not sense a pet within the predetermined distance range for more than a predetermined time period during an operation of the light device.

The illumination assembly may include a light diffuser forming an outer surface of the illumination assembly. A shape of an upper end of the light diffuser may correspond to a shape of a lower surface of the plate below the edge. The edge of the plate may be provided on the upper end of the light diffuser. The light diffuser may be inclined inward from the upper end to a lower end of the light diffuser. The plate may include an edge projection protruding downward from an edge of the plate. The light diffuser may include a projection protruding upward from the upper end of the light diffuser at a position spaced inward from an outer surface of the light diffuser. An inner surface of the edge projection and an outer surface of the projection may be provided adjacent to and contact each other. The edge projection may be inclined inward from an upper end of the edge projection toward a lower end of the edge projection.

A partition plate may partition the tank from the illumination assembly. The partition plate may be coupled to a lower side of the illumination assembly. The illumination assembly further may include a light support provided on an inner side of the light diffuser and provided on the partition plate. A light device may be installed on an outer surface of the light support.

A liquid guide may be formed with a drain passage to discharge liquid falling from the plate into the tank. The liquid guide may be provided below and spaced apart from the plate. The light diffuser may be provided between the plate and the liquid guide. The liquid guide may include an outer wall which may be inclined outward toward from a bottom end of the outer wall toward an upper end of the outer wall. The outer wall may be provided on the tank. The liquid guide may further include an inner wall provided at an inner side of the outer wall. The drain passage may be formed between the inner wall and the outer wall. The outer wall may be lower than an upper end of the plate and the light diffuser. The light diffuser may be provided on the inner wall.

Embodiments disclosed herein may be implemented as a liquid dispenser comprising a tank to store liquid, a pump to pump liquid stored inside the tank, a pipe connected to the pump, a plate provided above the tank and supplied with liquid from the pipe, and an illumination assembly provided below the plate and having at least one organic light emitting diode (OLED).

Embodiments disclosed herein may be implemented as a liquid dispenser comprising a tank, a pump provided inside the tank to pump liquid stored inside the tank, a plate provided above the tank, a pipe connected to the pump and the plate to provide liquid from the pump to the plate, and an illumination assembly installed between the tank and the plate to illuminate liquid falling from the plate.

The effects of the present disclosure are not limited to the effects mentioned above, and other effects not mentioned can be clearly understood by those skilled in the art from the description of the claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, including:
a tank;
a pump provided inside the tank to pump liquid;
a pipe connected to the pump;
a plate provided above the tank and having a hole communicating with the pipe to supply liquid from the pipe to the plate, the liquid falling from an outer edge of the plate and into the tank;
an illumination assembly provided between the tank and the plate; and
a partition plate to partition the tank from the illumination assembly, wherein the partition plate is coupled to a lower side of the illumination assembly,
wherein a lower end of the illumination assembly has a horizontal dimension smaller than a horizontal dimension of the plate and includes:
a light diffuser positioned to support the plate and having a ring shape;
a light device that is located radially between the light diffuser and the pipe, and that emits light through the light diffuser in a radially outward direction to illuminate liquid falling from the plate; and
a light support provided to extend between the plate and the partition plate and having a ring shape,
wherein the light device is installed on an upper end of an outer circumferential surface of the light support, and
wherein an upper end of the light diffuser is coupled to the plate, and a lower end of the light diffuser is coupled to a lower end of the outer circumferential surface of the light support such that the plate, the light diffuser, and the light support combine to form a housing around the light device that prevents the light device from being exposed to liquid.

2. The liquid dispenser of claim 1, wherein the plate has an upper surface over which water supplied through the hole flows toward an edge of the plate, and wherein the edge is curved.

3. The liquid dispenser of claim 1, wherein the illumination assembly comprises at least one organic light emitting diode (OLED).

4. The liquid dispenser of claim 3, wherein the OLED is formed in a ring shape.

5. The liquid dispenser of claim 1, further including a controller to control an operation of the pump and the illumination assembly.

6. The liquid dispenser of claim 5, wherein the light device of the illumination assembly is turned on when a pump is operated, and the light device is turned off when an operation of the pump is stopped.

7. The liquid dispenser of claim 5, further including a plurality of proximity sensors to sense a position of a pet within a predetermined distance range, wherein the plurality of proximity sensors are installed apart from each other along a periphery of the liquid dispenser.

8. The liquid dispenser of claim 7, wherein the controller turns on the light device when at least one of the plurality of proximity sensors senses a pet to be within the predetermined distance range.

9. The liquid dispenser of claim 8, wherein the controller turns off the light device when the plurality of proximity sensors do not sense a pet within the predetermined distance range for more than a predetermined time period during an operation of the light device.

10. The liquid dispenser of claim 1, wherein the light diffuser forms an outer surface of the illumination assembly.

11. The liquid dispenser of claim 10, wherein a shape of an upper end of the light diffuser corresponds to a shape of a lower surface of the plate below an edge of the plate, and wherein the edge of the plate is provided on the upper end of the light diffuser.

12. The liquid dispenser of claim 11, wherein the light diffuser is inclined inward from the upper end to a lower end of the light diffuser.

13. The liquid dispenser of claim 11, wherein the plate includes an edge projection protruding downward from the edge of the plate,
wherein the light diffuser includes a projection protruding upward from the upper end of the light diffuser at a position spaced inward from an outer surface of the light diffuser, and
wherein an inner surface of the edge projection and an outer surface of the projection of the light diffuser are provided adjacent to and contact each other.

14. The liquid dispenser of claim 13, wherein the edge projection is inclined inward from an upper end of the edge projection toward a lower end of the edge projection.

15. The liquid dispenser of claim 10, further including a liquid guide formed with a drain passage to discharge liquid falling from the plate into the tank, wherein the liquid guide is provided below and spaced apart from the plate, and wherein the light diffuser is provided between the plate and the liquid guide.

16. The liquid dispenser of claim 15, wherein the liquid guide further includes:
an outer wall which is inclined outward toward from a bottom end of the outer wall toward an upper end of the outer wall, wherein the outer wall is provided on the tank; and
an inner wall provided at an inner side of the outer wall, wherein the drain passage is formed between the inner wall and the outer wall, wherein the outer wall is lower than an upper end of the plate and an upper end of the light diffuser, and wherein the light diffuser is provided on the inner wall.

17. A liquid dispenser, including:
a tank to hold liquid;
a pump provided inside the tank to pump the liquid;
a pipe connected to the pump;
a plate provided above the tank and having a hole, water from the pump being received at the hole from the pipe and flowing radially outward to an outer edge of the plate and back into the tank; and
an illumination assembly provided between the tank and the plate and radially outside of the pipe,
wherein the illumination assembly includes:
a light diffuser having a ring shape;
a light support provided within the light diffuser; and
a light that is provided on an outer circumferential surface of the light support to emit light through the light diffuser, wherein the light diffuser is directly coupled to the outer edge of the plate and directly coupled to a section of the outer circumferential surface of the light support below the light, and the light diffuser is inclined inward from the plate to the light support.

18. The liquid dispenser of claim 17, wherein the lower end of the light diffuser includes an inward protrusion, and the lower end of the outer circumferential surface of the light support includes a recess to receive the inward protrusion of the light diffuser.

* * * * *

UNITED STATES PATENT AND TRADEMARK OFFICE
CERTIFICATE OF CORRECTION

| | | |
|---|---|---|
| PATENT NO. | : 11,771,058 B2 | Page 1 of 1 |
| APPLICATION NO. | : 16/569827 | |
| DATED | : October 3, 2023 | |
| INVENTOR(S) | : Hyunsun Yoo et al. | |

It is certified that error appears in the above-identified patent and that said Letters Patent is hereby corrected as shown below:

On the Title Page

(72) Inventors should read: Hyunsun YOO, (Seoul (KR); Jaehung CHUN, (Seoul (KR); Yousook EUN, (Seoul (KR); Joogyeom KIM, (Seoul (KR); Sungkyung KIM, (Seoul (KR); Myongsun KIM, (Seoul (KR)

Signed and Sealed this
Thirty-first Day of October, 2023

Katherine Kelly Vidal
*Director of the United States Patent and Trademark Office*